United States Patent
Van der Auwera et al.

(10) Patent No.: US 9,538,200 B2
(45) Date of Patent: *Jan. 3, 2017

(54) SIGNALING OF DEBLOCKING FILTER PARAMETERS IN VIDEO CODING

(71) Applicant: Qualcomm Incorporated, San Diego, CA (US)

(72) Inventors: Geert Van der Auwera, San Diego, CA (US); Ye-Kui Wang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 778 days.

This patent is subject to a terminal disclaimer.

(21) Appl. No.: 13/743,592

(22) Filed: Jan. 17, 2013

(65) Prior Publication Data

US 2013/0188733 A1 Jul. 25, 2013

Related U.S. Application Data

(60) Provisional application No. 61/588,454, filed on Jan. 19, 2012, provisional application No. 61/593,015, (Continued)

(51) Int. Cl.
*H04N 7/12* (2006.01)
*H04N 19/70* (2014.01)
(Continued)

(52) U.S. Cl.
CPC ............ *H04N 19/70* (2014.11); *H04N 19/117* (2014.11); *H04N 19/174* (2014.11); *H04N 19/46* (2014.11); *H04N 19/86* (2014.11)

(58) Field of Classification Search
None
See application file for complete search history.

(56) References Cited

U.S. PATENT DOCUMENTS 7,991,236 B2 8/2011 Guo et al.
8,848,789 B2 9/2014 Bao
(Continued)

FOREIGN PATENT DOCUMENTS

RU 2414092 C2 3/2011
WO 2005027495 A2 3/2005
(Continued)

OTHER PUBLICATIONS

Bross B., "High Efficiency Video Coding (HEVC) text specification draft 8", Jul. 23, 2012, 294 Pages, XP030112947, http://phenix.it-sudparis.ed/jct/doc_end_user/documents/10_Stockholm/wg11/JCTVC-J1003-v1.zip.
(Continued)

*Primary Examiner* — Sath V Perungavoor
*Assistant Examiner* — Dakshesh Parikh
(74) *Attorney, Agent, or Firm* — Shumaker & Sieffert, P.A.

(57) ABSTRACT

This disclosure describes techniques for signaling deblocking filter parameters for a current slice of video data with reduced bitstream overhead. Deblocking filter parameters may be coded in one or more of a picture layer parameter set and a slice header. The techniques reduce a number of bits used to signal the deblocking filter parameters by coding a first syntax element that indicates whether deblocking filter parameters are present in both the picture layer parameter set and the slice header, and only coding a second syntax element in the slice header when both sets of deblocking filter parameters are present. Coding the second syntax element is eliminated when deblocking filter parameters are present in only one of the picture layer parameter set or the slice header. The second syntax element indicates which set of deblocking filter parameters to use to define a deblocking filter applied to a current slice.

28 Claims, 9 Drawing Sheets

Related U.S. Application Data filed on Jan. 31, 2012, provisional application No. 61/620,339, filed on Apr. 4, 2012.

(51) Int. Cl.
  *H04N 19/46* (2014.01)
  *H04N 19/117* (2014.01)
  *H04N 19/174* (2014.01)
  *H04N 19/86* (2014.01)

(56) References Cited

U.S. PATENT DOCUMENTS

| | | | |
|---|---|---|---|
| 2008/0137753 A1* | 6/2008 | He | H04N 19/139 375/240.24 |
| 2008/0240252 A1* | 10/2008 | He | H04N 19/176 375/240.24 |
| 2009/0028247 A1 | 1/2009 | Suh et al. | |
| 2009/0028427 A1 | 1/2009 | Yamad et al. | |
| 2010/0158116 A1 | 6/2010 | Jeon et al. | |
| 2010/0322529 A1 | 12/2010 | Amonou et al. | |
| 2011/0051812 A1 | 3/2011 | Tanaka et al. | |
| 2014/0369404 A1 | 12/2014 | Van Der Auwera et al. | |

FOREIGN PATENT DOCUMENTS

| | | |
|---|---|---|
| WO | 2007112417 | 10/2007 |
| WO | 2011075096 A1 | 6/2011 |
| WO | 2011100465 A1 | 8/2011 |

OTHER PUBLICATIONS

European Office Action from corresponding European Application Serial No. 13701896.6 dated Jun. 30, 2015 (5 pages).
ITU-T H.265, Series H: Audiovisual and Multimedia Systems, Infrastructure of audiovisual services—Coding of moving video, High efficiency video coding, The International Telecommunication Union, Apr. 2013, 317 pp.
Bross et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.
International Preliminary Report on Patentability from international application No. PCT/US2013/022230, mailed Mar. 27, 2014, 8 pp.
Second Written Opinion of international application No. PCT/US2013/022230, mailed Jan. 7, 2014, 6 pp.
Bross et al., "High Efficiency Video Coding (HEVC) text specification draft 10 (for FDIS & Last Call)," Joint Collaborative Team on Video Coding, JCTVC-L1003_v34, Jan. 14-23, 2013, 310 pp.
Bross et al., "High efficiency video coding (HEVC) text specification draft 6," Joint Collaborative Team on Video Coding, JCTVC-H1003, Nov. 21-30, 2011, 259 pp.
Bross et al., "High efficiency video coding (HEVC) text specification draft 7," Joint Collaborative Team on Video Coding, JCTVC-I1003_D2, Apr. 27-May 7, 2012, 290 pp.
Bross et al., "High efficiency video coding (HEVC) text specification draft 8," Joint Collaborative Team on Video Coding, JCTVC-J1003_D7, Jul. 11-20, 2012, 261 pp.
Bross et al., "High efficiency video coding (HEVC) text specification draft 9," Joint Collaborative Team on Video Coding, JCTVC-K1003_v7, Oct. 10-19, 2012, 290 pp.
Bross et al., "WD4: Working Draft 4 of High-Efficiency Video Coding," Joint Collaborative Team on Video Coding, JCTVC-F803_d2, Jul. 14-22, 2011, 226 pp.
Bross et al., "WD5: Working Draft 5 of High-Efficiency Video Coding," Joint Collaborative Team on Video Coding, JCTVC-G1103_d2, Nov. 21-30, 2011, 214 pp.
Bross et al., "WD5: Working Draft 5 of High-Efficiency Video Coding," Joint Collaborative Team on Video Coding, JCTVC-G1103_d3, Nov. 21-30, 2011, 215 pp.
International Search Report and Written Opinion—PCT/US2013/022230—ISA/EPO—Apr. 11, 2013—11 pp.
International Telecommunication Union, "Advanced video coding for generic audiovisual services," Standardization Sector of ITU, Jun. 2011, 674 pp.
Li et al., "APS Referencing," Joint Collaborative Team on Video Coding, JCTVC-H0069, Feb. 1-10, 2012, 11 pp.
Li, et al., "Multiple Adaptation Parameter Sets Referring," Joint Collaborative Team on Video Coding, JCTVC-G332, Nov. 21-30, 2011, 7 pp.
Minezawa et al., "On partial updating of APS parameters," Joint Collaborative Team on Video Coding, JCTVC-H0255_r3, Feb. 1-10, 2012, 12 pp.
Norkin, "BoG report on resolving deblocking filter description issues," Joint Collaborative Team on Video Coding, JCTVC-G1035_r1 , Nov. 21-30, 2011, 22 pp.
Tanaka et al., "Non-CE4 Subtest3: Extension of Adaptation Parameter Sets syntax for Quantization matrix," Joint Collaborative Team on Video Coding, JCTVC-G295, Nov. 21-30, 2011, 7 pp.
Van Der Auwera et al.,"Transform Dependent Deblocking Filter Parameter Adjustment in Slice Level", Joint Collaborative Team on Video Coding, JCTVC-G291, Nov. 21-30, 2011, 5 pp.
Wenger et al., "Adaptation Parameter Set (APS)," Joint Collaborative Team on Video Coding, JCTVC-F747r3, Jul. 14-22, 2011, 10 pp.
Wiegand et al., "WD2: Working Draft 2 of High-Efficiency Video Coding", Joint Collaborative Team on Video Coding, JCTVC-D503, Jan. 20-28, 2011, 153 pp.
Wiegand et al., "WD3: Working Draft 3 of High-Efficiency Video Coding," Joint Collaborative Team on Video Coding, JCTVC-E603, Mar. 16-23, 2011,193 pp.
Wiegand et al.,"WD1: Working Draft 1 of High-Efficiency Video Coding", Joint Collaborative Team on Video Coding, JCTVC-C403, Oct. 7-15, 2010, 137 pp.

* cited by examiner

| p7$_0$ | p6$_0$ | p5$_0$ | p4$_0$ | p3$_0$ | p2$_0$ | p1$_0$ | p0$_0$ | q0$_0$ | q1$_0$ | q2$_0$ | q3$_0$ | q4$_0$ | q5$_0$ | q6$_0$ | q7$_0$ |
|---|---|---|---|---|---|---|---|---|---|---|---|---|---|---|---|
| p7$_1$ | p6$_1$ | p5$_1$ | p4$_1$ | p3$_1$ | p2$_1$ | p1$_1$ | p0$_1$ | q0$_1$ | q1$_1$ | q2$_1$ | q3$_1$ | q4$_1$ | q5$_1$ | q6$_1$ | q7$_1$ |
| p7$_2$ | p6$_2$ | p5$_2$ | p4$_2$ | p3$_2$ | p2$_2$ | p1$_2$ | p0$_2$ | q0$_2$ | q1$_2$ | q2$_2$ | q3$_2$ | q4$_2$ | q5$_2$ | q6$_2$ | q7$_2$ |
| p7$_3$ | p6$_3$ | p5$_3$ | p4$_3$ | p3$_3$ | p2$_3$ | p1$_3$ | p0$_3$ | q0$_3$ | q1$_3$ | q2$_3$ | q3$_3$ | q4$_3$ | q5$_3$ | q6$_3$ | q7$_3$ |
| p7$_4$ | p6$_4$ | p5$_4$ | p4$_4$ | p3$_4$ | p2$_4$ | p1$_4$ | p0$_4$ | q0$_4$ | q1$_4$ | q2$_4$ | q3$_4$ | q4$_4$ | q5$_4$ | q6$_4$ | q7$_4$ |
| p7$_5$ | p6$_5$ | p5$_5$ | p4$_5$ | p3$_5$ | p2$_5$ | p1$_5$ | p0$_5$ | q0$_5$ | q1$_5$ | q2$_5$ | q3$_5$ | q4$_5$ | q5$_5$ | q6$_5$ | q7$_5$ |
| p7$_6$ | p6$_6$ | p5$_6$ | p4$_6$ | p3$_6$ | p2$_6$ | p1$_6$ | p0$_6$ | q0$_6$ | q1$_6$ | q2$_6$ | q3$_6$ | q4$_6$ | q5$_6$ | q6$_6$ | q7$_6$ |
| p7$_7$ | p6$_7$ | p5$_7$ | p4$_7$ | p3$_7$ | p2$_7$ | p1$_7$ | p0$_7$ | q0$_7$ | q1$_7$ | q2$_7$ | q3$_7$ | q4$_7$ | q5$_7$ | q6$_7$ | q7$_7$ |

FIG. 5

SIGNALING OF DEBLOCKING FILTER PARAMETERS IN VIDEO CODING

This application claims the benefit of U.S. Provisional Application No. 61/588,454, filed Jan. 19, 2012, U.S. Provisional Application No. 61/593,015, filed Jan. 31, 2012, and U.S. Provisional Application No. 61/620,339, filed Apr. 4, 2012, the entire content of each of which is incorporated herein by reference.

TECHNICAL FIELD

This disclosure relates to video coding, and more particularly, to deblocking video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode that defines how the predictive block is created and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for signaling deblocking filter parameters with reduced bitstream overhead for a current slice of video data. The deblocking filter parameters define a deblocking filter used to remove blockiness artifacts from decoded video blocks of the slice. The deblocking filter parameters include syntax elements defined to indicate whether deblocking filtering is enabled or disabled and, if enabled, deblocking filter parameter offsets for threshold values $t_c$ and $\beta$. Deblocking filter parameters may be coded in one or more of a picture layer parameter set and a slice header. The picture layer parameter set may comprise either a picture parameter set (PPS) or an adaptation parameter set (APS).

The techniques may reduce a number of bits used to signal the deblocking filter parameters by coding a first syntax element defined to indicate whether deblocking filter parameters are present in both the picture layer parameter set and the slice header, and only coding a second syntax element in the slice header when deblocking filter parameters are present in both the picture layer parameters set and the slice header. The second syntax element is defined to indicate whether to use a first set of deblocking filter parameters included in the picture layer parameter set or a second set of deblocking filter parameters included in the slice header to define the deblocking filter applied to the current video slice. In this case, when deblocking filter parameters are present in only one of the picture layer parameter set or the slice header, a video encoder may eliminate encoding of the second syntax element in the slice header, and a video decoder may determine, based on the first syntax element, that the second syntax element is not present in the slice header to be decoded.

In one example, this disclosure is directed to a method of decoding video data, the method comprising decoding a first syntax element defined to indicate whether deblocking filter parameters are present in both a picture layer parameter set and a slice header, when the first syntax element indicates that deblocking filter parameters are present in both the picture layer parameter set and the slice header, decoding a second syntax element in the slice header defined to indicate whether to use a first set of deblocking filter parameters included in the picture layer parameter set or a second set of deblocking filter parameters included in the slice header to define a deblocking filter applied to a current video slice, and, when the first syntax element indicates that deblocking filter parameters are not present in both the picture layer parameter set and the slice header, determining that the second syntax element is not present in the slice header to be decoded.

In another example, this disclosure is directed to a video decoding device comprising a memory that stores video data, and a processor configured to decode a first syntax element defined to indicate whether deblocking filter parameters are present in both a picture layer parameter set and a slice header. The processor is configured to, when the first syntax element indicates that deblocking filter parameters are present in both the picture layer parameter set and the slice header, decode a second syntax element in the slice header defined to indicate whether to use a first set of deblocking filter parameters included in the picture layer parameter set or a second set of deblocking filter parameters included in the slice header to define a deblocking filter applied to a current video slice. On the other hand, the processor is configured to, when the first syntax element indicates that deblocking filter parameters are not present in both the picture layer parameter set and the slice header, determine that the second syntax element is not present in the slice header to be decoded.

In a further example, this disclosure is directed to a video decoding device comprising means for decoding a first syntax element defined to indicate whether deblocking filter parameters are present in both a picture layer parameter set and a slice header, when the first syntax element indicates that deblocking filter parameters are present in both the picture layer parameter set and the slice header, means for decoding a second syntax element in the slice header defined to indicate whether to use a first set of deblocking filter parameters included in the picture layer parameter set or a second set of deblocking filter parameters included in the slice header to define a deblocking filter applied to a current video slice, and, when the first syntax element indicates that deblocking filter parameters are not present in both the picture layer parameter set and the slice header, means for determining that the second syntax element is not present in the slice header to be decoded.

In another example, this disclosure is directed to a computer readable medium comprising instructions for decoding video data that when executed cause one or more processors to decode a first syntax element defined to indicate whether deblocking filter parameters are present in both a picture layer parameter set and a slice header, when the first syntax element indicates that deblocking filter parameters are present in both the picture layer parameter set and the slice header, decode a second syntax element in the slice header defined to indicate whether to use a first set of deblocking filter parameters included in the picture layer parameter set or a second set of deblocking filter parameters included in the slice header to define a deblocking filter applied to a current video slice, and, when the first syntax element indicates that deblocking filter parameters are not present in both the picture layer parameter set and the slice header, determine that the second syntax element is not present in the slice header to be decoded.

In an additional example, this disclosure is director to a method of encoding video data, the method comprising encoding a first syntax element defined to indicate whether deblocking filter parameters are present in both a picture layer parameter set and a slice header, when the first syntax element indicates that deblocking filter parameters are present in both the picture layer parameter set and the slice header, encoding a second syntax element in the slice header defined to indicate whether to use a first set of deblocking filter parameters included in the picture layer parameter set or a second set of deblocking filter parameters included in the slice header to define a deblocking filter applied to a current video slice, and, when the first syntax element indicates that deblocking filter parameters are not present in both the picture layer parameter set and the slice header, eliminating encoding of the second syntax element in the slice header.

In a further example, this disclosure is directed to a video encoding device comprising a memory that stores video data, and a processor configured to encode a first syntax element defined to indicate whether deblocking filter parameters are present in both a picture layer parameter set and a slice header. The processor is configured to, when the first syntax element indicates that deblocking filter parameters are present in both the picture layer parameter set and the slice header, encode a second syntax element in the slice header defined to indicate whether to use a first set of deblocking filter parameters included in the picture layer parameter set or a second set of deblocking filter parameters included in the slice header to define a deblocking filter applied to a current video slice. On the other hand, the processor is configured to, when the first syntax element indicates that deblocking filter parameters are not present in both the picture layer parameter set and the slice header, eliminate encoding of the second syntax element in the slice header.

In another example, this disclosure is directed to a video encoding device comprising means for encoding a first syntax element defined to indicate whether deblocking filter parameters are present in both a picture layer parameter set and a slice header, when the first syntax element indicates that deblocking filter parameters are present in both the picture layer parameter set and the slice header, means for encoding a second syntax element in the slice header defined to indicate whether to use a first set of deblocking filter parameters included in the picture layer parameter set or a second set of deblocking filter parameters included in the slice header to define a deblocking filter applied to a current video slice, and, when the first syntax element indicates that deblocking filter parameters are not present in both the picture layer parameter set and the slice header, means for eliminating encoding of the second syntax element in the slice header.

In a further example, this disclosure is directed to a computer readable medium comprising instructions for encoding video data that when executed cause one or more processors to encode a first syntax element defined to indicate whether deblocking filter parameters are present in both a picture layer parameter set and a slice header, when the first syntax element indicates that deblocking filter parameters are present in both the picture layer parameter set and the slice header, encode a second syntax element in the slice header defined to indicate whether to use a first set of deblocking filter parameters included in the picture layer parameter set or a second set of deblocking filter parameters included in the slice header to define a deblocking filter applied to a current video slice, and, when the first syntax element indicates that deblocking filter parameters are not present in both the picture layer parameter set and the slice header, eliminate encoding of the second syntax element in the slice header.

The details of one or more examples are set forth in the accompanying drawings and the description below. Other features, objects, and advantages will be apparent from the description and drawings, and from the claims.

BRIEF DESCRIPTION OF DRAWINGS

FIG. 5 is a conceptual diagram illustrating pixel positions near an edge of a video block between sub-blocks.

DETAILED DESCRIPTION

Some example techniques of this disclosure reduce the number of bits used to signal deblocking filter parameters for a current video slice by coding a first syntax element defined to indicate whether deblocking filter parameters are present in both a picture layer parameter set and a slice header, and only coding a second syntax element in the slice header when deblocking filter parameters are present in both the picture layer parameters set and the slice header. The second syntax element is defined to indicate whether to use a first set of deblocking filter parameters included in the picture layer parameter set or a second set of deblocking filter parameters included in the slice header to define the deblocking filter applied to the current video slice. In this case, when deblocking filter parameters are present in only one of the picture layer parameter set or the slice header, a video encoding device may eliminate encoding of the second syntax element in the slice header, and a video decoding device may determine, based on the first syntax element, that the second syntax element is not present in the slice header to be decoded.

Figure 1:
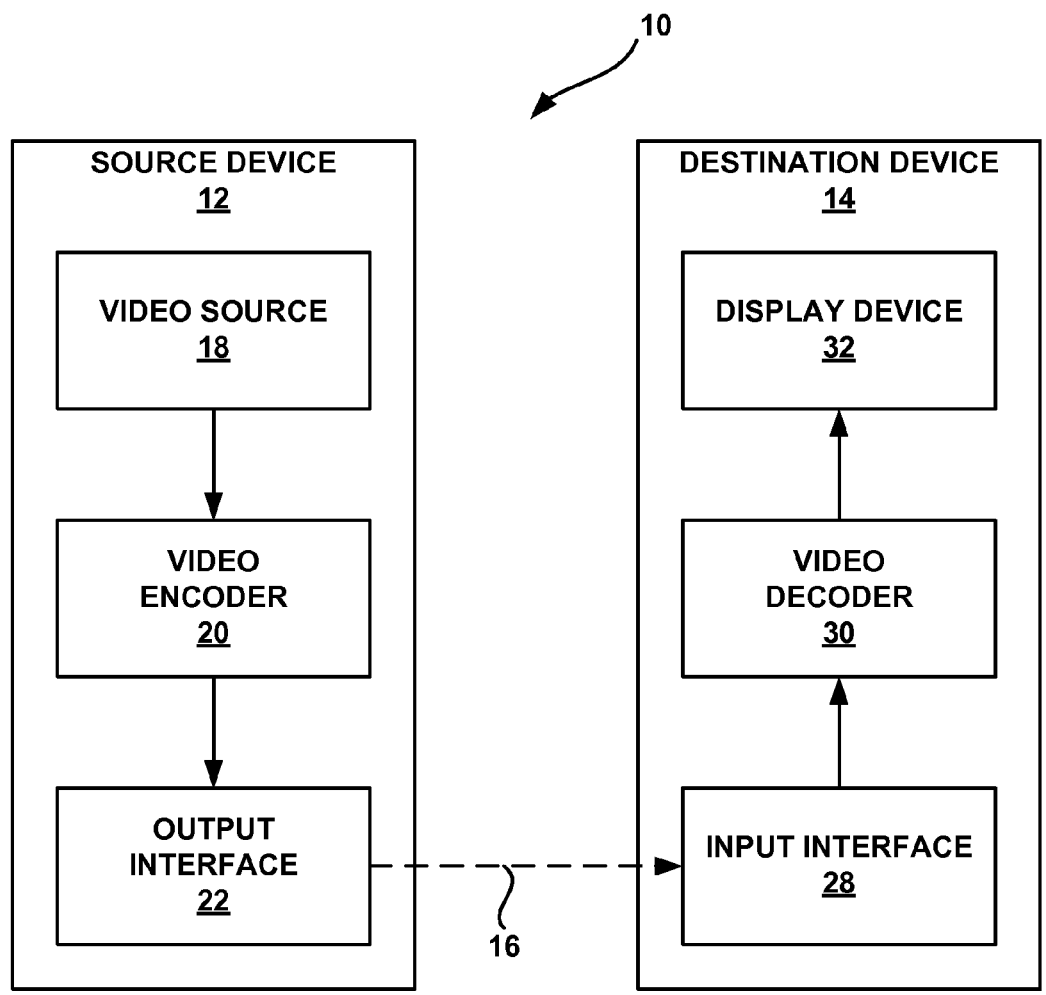
FIG. 1 is a block diagram illustrating an example video encoding and decoding system that may code deblocking filter parameters according to the techniques described in this disclosure.

FIG. 1 is a block diagram illustrating an example video encoding and decoding system 10 that may code deblocking filter parameters according to the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In another example, link 16 may correspond to a storage medium that may store the encoded video data generated by source device 12 and that destination device 14 may access as desired via disk access or card access. The storage medium may include any of a variety of locally accessed data storage media such as Blu-ray discs, DVDs, CD-ROMs, flash memory, or any other suitable digital storage media for storing encoded video data. In a further example, link 16 may correspond to a file server or another intermediate storage device that may hold the encoded video generated by source device 12 and that destination device 14 may access as desired via streaming or download. The file server may be any type of server capable of storing encoded video data and transmitting that encoded video data to the destination device 14 Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the file server may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also be stored onto a storage medium or a file server for later access by destination device 14 for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on a data storage medium, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The Joint Collaborative Team on Video Coding (JCT-VC) is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be square or non-square in shape. Syntax data associated with a CU may also describe, for example, partitioning of the CU into one or more TUs according to a quadtree. A TU may be partitioned to be square or non-square in shape.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0 or List 1) for the motion vector.

In general, a TU is used for the transform and quantization processes. A CU having one or more PUs may also include one or more TUs. Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N=0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), probability interval partitioning entropy codes (PIPE), or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In addition to signaling the encoded video data in a bitstream to video decoder 30 in destination device 14, video encoder 20 may also decode the encoded video data and reconstruct the blocks within a video frame or picture for use as reference data during the intra- or inter-prediction process for subsequently coded blocks. After dividing a video frame or picture into blocks (e.g., LCUs and sub-CUs thereof), encoding the blocks, and then decoding the blocks, however, perceptible artifacts at edges between the blocks may occur. In order to remove these "blockiness" artifacts, video encoder 20 may apply deblocking filters to the decoded video blocks prior to storage as reference blocks. Similarly, video decoder 30 may be configured to decode video data received in a bitstream from video encoder 20 of source device 12, and apply the same or similar deblocking filters to the decoded video data for purposes of displaying the video data as well as for using the video data as reference data for subsequently decoded video data.

Deblocking filtering performed by a video coding device, such as a video encoder 20 or video decoder 30, prior to storing the data for use as reference data is generally referred to as "in-loop" filtering, in that the filtering is performed within the coding loop. By configuring both video encoder 20 and video decoder 30 to apply the same deblocking techniques, the video coding devices can be synchronized, such that deblocking does not introduce error for subsequently coded video data that uses the deblocked video data as reference data.

Video encoder 20 and video decoder 30 are generally configured to determine, for each edge of a video block, including PU and TU edges, whether to apply a deblocking filter to deblock the edge. The video coding devices may be configured to determine whether to deblock an edge based on an analysis of one or more lines of pixels perpendicular to the edge, e.g., a line of 8 pixels. Thus, for example, for a vertical edge, a video coding device may determine whether to deblock the edge by examining four pixels to the left and four pixels to the right of the edge along a common line. The number of pixels selected generally corresponds to the smallest block for deblocking, e.g., 8×8 pixels. In this manner, the line of pixels used for analysis stretches across PU and TU edges of the video block with pixels on either side of the edge, e.g., to the left and right of an edge or above and below an edge. The line of pixels used for analysis of whether to perform deblocking for an edge is also referred to as a set of support pixels, or simply "support."

Video coding devices may be configured to execute deblocking decision functions based on the support for a particular edge. In general, deblocking decision functions are configured to detect high-frequency changes within the support pixels. Typically, when a high frequency change is detected, the deblocking decision function provides an indication that perceptible artifacts are present at the edge and deblocking should occur. The deblocking decision functions may also be configured to determine a type and strength of the deblocking filter to apply to the edge based on the support. The type and strength of the deblocking filter may be indicated by threshold values $t_c$ and $\beta$.

This disclosure describes techniques for signaling deblocking filter parameters for a current slice of video data with reduced bitstream overhead. The deblocking filter parameters define a deblocking filter used to reduce or remove blockiness artifacts from decoded video blocks of the current slice. The deblocking filter parameters include syntax elements configured to indicate whether deblocking filtering is enabled or disabled and, if enabled, deblocking filter parameter offsets for threshold values $t_c$ and $\beta$.

Deblocking filter parameters may be coded in one or more of a picture layer parameter set and a slice header. The picture layer parameter set may comprise either a picture parameter set (PPS) or an adaptation parameter set (APS). The PPS is a picture layer parameter set that contains data unlikely to change between pictures that refer to the PPS. The APS is a picture layer parameter set intended for use with picture-adaptive data that is likely to change from picture to picture. In one example, the APS includes parameters for a deblocking filter, an Adaptive Loop Filter (ALF), and a Sample Adaptive Offset (SAO). Including these parameters in the APS instead of the PPS may reduce a number of bits transmitted for a video sequence because constant PPS data does not need to be repeated when the deblocking filter, ALF, or SAO parameters change.

Figure 2:
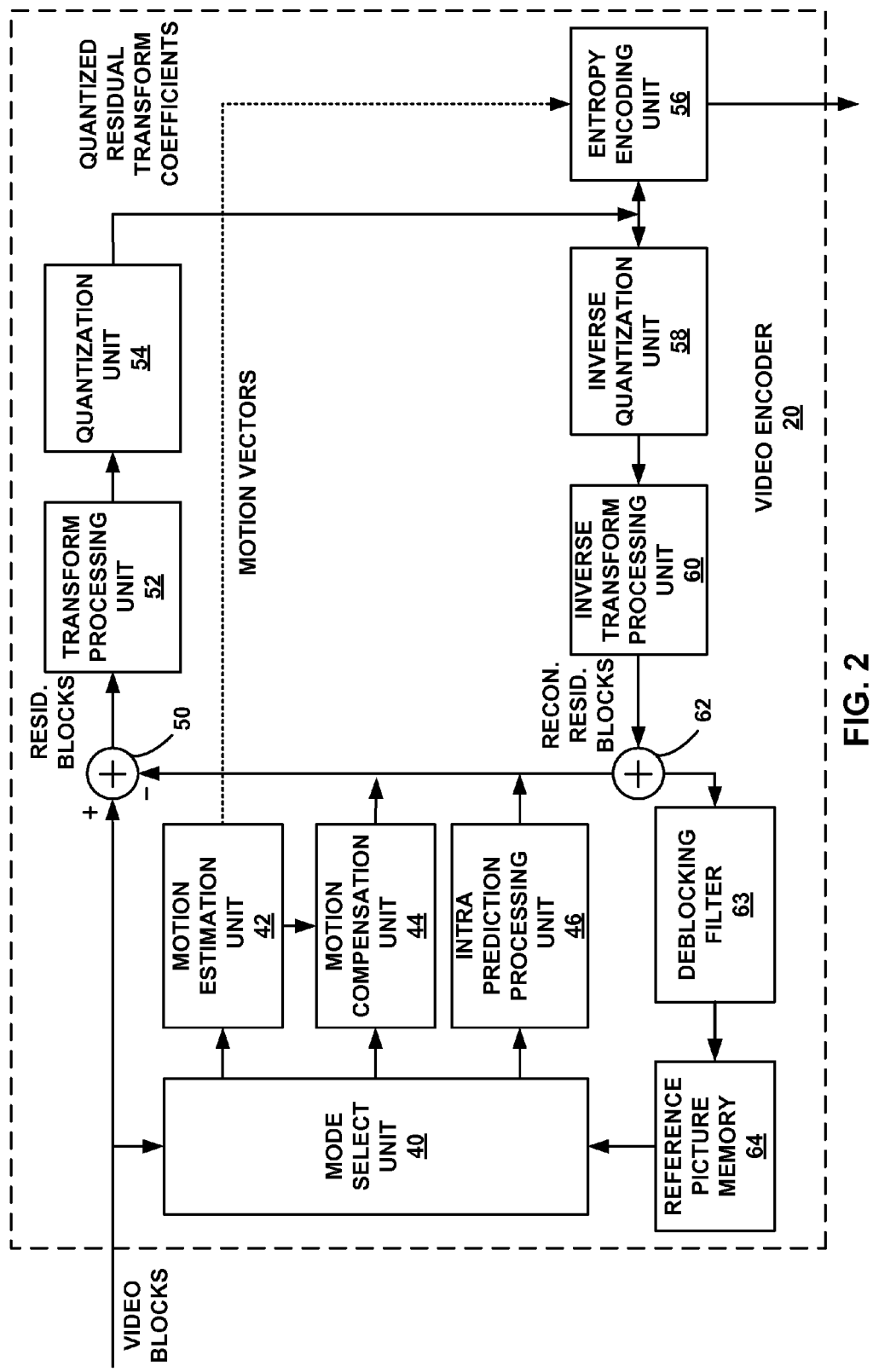
FIG. 2 is a block diagram illustrating an example of a video encoder that may implement the techniques described in this disclosure to encode deblocking filter parameters with reduced bitstream overhead.

FIG. 2 is a block diagram illustrating an example of video encoder 20 that may implement the techniques described in this disclosure to encode deblocking filter parameters with reduced bitstream overhead. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes mode select unit 40, motion estimation unit 42, motion compensation unit 44, intra prediction processing unit 46, reference picture memory 64, summer 50, transform processing unit 52, quantization unit 54, and entropy encoding unit 56. For video block reconstruction, video encoder 20 also includes inverse quantization unit 58, inverse transform processing unit 60, and summer 62. A deblocking filter 63 is also included to filter block boundaries to remove blockiness artifacts from reconstructed video blocks.

As shown in FIG. 2, video encoder 20 receives a current video block within a video slice to be encoded. The slice may be divided into multiple video blocks. Mode select unit 40 may select one of the coding modes, intra or inter, for the current video block based on error results. If the intra or inter modes are selected, mode selection unit 40 provides the resulting intra- or inter-coded block to summer 50 to generate residual block data and to summer 62 to reconstruct the encoded block for use as a reference block within a reference picture stored in reference picture memory 64. Intra prediction processing unit 46 performs intra-predictive coding of the current video block relative to one or more neighboring blocks in the same frame or slice as the current block to be coded to provide spatial compression. Motion estimation unit 42 and motion compensation unit 44 perform inter-predictive coding of the current video block relative to one or more predictive blocks in one or more reference pictures to provide temporal compression.

In the case of inter-coding, motion estimation unit 42 may be configured to determine the inter-prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may calculate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

After motion compensation unit 44 generates the predictive block for the current video block, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), or another entropy encoding technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block of a reference picture for storage in reference picture memory 64. The reference block is filtered by deblocking filter 63 in order to remove blockiness artifacts. The reference block is then stored in reference picture memory 64. The reference block may be used by motion estimation unit 42 and motion compensation unit 44 as a reference block to inter-predict a block in a subsequent video frame or picture.

In accordance with the techniques of this disclosure, video encoder 20 includes deblocking filter 63 that selectively filters the output of summer 62. In particular, deblocking filter 63 receives reconstructed video data from summer 62, which corresponds to predictive data received from either motion compensation unit 44 or intra-prediction unit 46 added to inverse quantized and inverse transformed residual data. In this manner, deblocking filter 63 receives decoded blocks of video data, e.g., decoded blocks corresponding to CUs of an LCU and/or LCUs of a slice or picture, and selectively filters the blocks to remove blockiness artifacts.

Deblocking filter 63 in video encoder 20 filters certain TU and PU edges of a decoded video block based on a result from a boundary strength computation and deblocking decisions. Deblocking filter 63 is generally configured to analyze pixels of a video block near a given edge of the block to determine whether and how to deblock the edge. More particularly, the deblocking decisions may include whether the deblocking filter is on or off, whether the deblocking filter is weak or strong, and the strength of the weak filter for a given video block. Deblocking filter 63 may alter the values of the pixels near the given edge when a high-frequency change in values is detected in order to remove blockiness artifacts perceptible at the edge.

The boundary strength computation and the deblocking decisions are dependent on threshold values $t_c$ and $\beta$. The threshold values $t_c$ and $\beta$ of the deblocking filter depend on a parameter Q, which is derived from a quantization parameter (QP) value and a boundary strength (Bs) for the current video block as follows:

If Bs=2,then $Tc$Offset=2

If Bs≤1,then $Tc$Offset=0

For $t_C$: $Q$=Clip3(0,MAX_QP+2,QP+$Tc$Offset); MAX_QP=51

For β: $Q$=Clip3(0,MAX_QP,QP)

Clip3($th1,th2$,value)=min($th1$,max($th2$,value))

The threshold values $t_c$ and β may be stored in a table that is accessible based on the parameter Q derived from the QP value of the video block. The deblocking process is described in more detail below with respect to deblocking filter 100 illustrated in FIG. 4.

This disclosure describes techniques for signaling, with reduced bitstream overhead, deblocking filter parameters used to define deblocking filter 63 for a current slice of video data. Video encoder 20 determines the deblocking filter parameters that define deblocking filter 63 and then signals the deblocking filter parameters so that video decoder 30 can apply the same or similar deblocking filter to decoded video blocks. The deblocking filter parameters include syntax elements defined to indicate whether deblocking filtering is enabled or disabled and, if enabled, deblocking filter parameter offsets for threshold values $t_c$ and β.

Deblocking filter parameters may be coded in one or more of a picture layer parameter set and a slice header for signaling to video decoder 30. The picture layer parameter set may comprise either a picture parameter set (PPS) or an adaptation parameter set (APS). The PPS is a picture layer parameter set that contains data unlikely to change between pictures that refer to the PPS. The APS is a picture layer parameter set intended for use with picture-adaptive data that is likely to change from picture to picture.

Entropy encoding unit 56 of video encoder 20 encodes a first syntax element defined to indicate whether deblocking filter parameters are present in both a picture layer parameter set and a slice header for pictures referring to the picture layer parameter set. According to the techniques described in this invention, entropy encoding unit 56 encodes deblocking filter parameters for a current video slice with reduced bitstream overhead by only encoding a second syntax element in the slice header when deblocking filter parameters are present in both the picture layer parameter set and the slice header.

When deblocking filter parameters are not present in both the picture layer parameter set and the slice header, entropy encoding unit 56 eliminates coding a second syntax element in the slice header defined to indicate which set of deblocking filter parameters is used to define deblocking filter 63 for a current video slice. In the case where deblocking filter parameters are only present in one of the picture layer parameter set or the slice header, deblocking filter 63 is defined for the current video slice based on the set of deblocking filter parameters that are present in either the picture layer parameter set or the slice header. The second syntax element, therefore, is unnecessary to indicate the deblocking filter parameters to video decoder 30 because no decision needs to made between the picture layer parameter set and the slice header regarding which set of deblocking filter parameters to use to define the deblocking filter at video decoder 30.

When the deblocking filter parameters are present in both the picture layer parameter set and the slice header, entropy encoding unit 56 encodes the second syntax element in the slice header defined to indicate whether to use a first set of deblocking parameters included in the picture layer parameter set or a second set of deblocking parameters included in the slice header. In this case, deblocking filter 63 is defined for the current video slice based on one of the first set or the second set of deblocking parameters. The second syntax element, therefore, is necessary to indicate the deblocking filter parameters used to define deblocking filter 63 in video encoder 20 so that video decoder 30 can apply the same or similar deblocking filter to decoded video blocks.

In some cases, entropy encoding unit 56 may also encode a control present syntax element defined to indicate whether any deblocking filter control syntax elements are present in either the picture layer parameter set or the slice header. The control present syntax element may be signaled in the picture layer parameter set or from a higher-layer parameter set, e.g., a sequence parameter set (SPS). The deblocking filter control syntax elements comprise the first and second syntax elements described above. Entropy encoding unit 56, therefore, encodes the control present syntax element prior to encoding the first syntax element. If no deblocking filter control syntax elements are present, video encoder 20 notifies video decoder 30 and does not encode the first or second syntax elements. In this case, video encoder 20 may use default deblocking filter parameters to define deblocking filter 63 applied to the decoded video blocks.

In other cases, entropy encoding unit 56 may encode a deblocking filter enabled syntax element defined to indicate whether deblocking filter 63 is enabled for one or more pictures of a video sequence prior to encoding the first syntax element. The deblocking filter enabled syntax element may be signaled in a higher-layer parameter set, e.g., a sequence parameter set (SPS). If deblocking filter 63 is disabled for the video sequence, video encoder 20 notifies video decoder 30 and does not encode the first or second syntax elements because deblocking filter 63 is not applied to the decoded video blocks. In this case, video encoder 20 also does not encode a control present syntax element.

In one example, the first syntax element comprises an override enabled flag coded in a PPS for a given picture. In this case, a first set of deblocking filter parameters is coded in the PPS and the override enabled flag indicates whether a second set of deblocking filter parameters is present in a slice header for one or more slices of the given picture that could be used to override the parameters from the PPS. In addition, the second syntax element comprises an override flag that may be coded in the slice header. When the override enabled flag in the PPS indicates that the second set of deblocking filter parameters is present in the slice header, entropy encoding unit 56 encodes the override flag to indicate to video decoder 30 whether to use the first set of deblocking filter parameters in the PPS or to override the first set of deblocking filter parameters with the second set of deblocking filter parameters included in the slice header to define the deblocking filter at video decoder 30. Otherwise, when the override enabled flag in the PPS indicates that only the first set of deblocking filter parameters in the PPS is present, entropy encoding unit 56 eliminates encoding of the override flag in the slice header. The specific syntax elements for this example are described in more detail below with respect to video decoder 30 in FIG. 3.

In another example, the first syntax element comprises an inherit enabled flag coded in a SPS and/or an APS for a given picture. In this case, a second set of deblocking filter parameters is coded in the slice header and the inherit enabled flag indicates whether a first set of deblocking filter parameters is present in the APS that could be inherited by the slice header. The second syntax element comprises an inherit flag that may be coded in the slice header. When the inherit enabled flag in the SPS and/or APS indicates that the first set of deblocking filter parameters is present in the APS, entropy encoding unit 56 encodes the inherit flag to indicate to video decoder 30 whether to use the second set of deblocking filter parameters in the slice header or to inherit the first set of deblocking filter parameters in the APS to define the deblocking filter at video decoder 30. Otherwise, when the inherit enabled flag in the SPS and/or APS indicates that only the second set of deblocking filter parameters in the slice header is present, entropy encoding unit 56 eliminates encoding of the inherit flag in the slice header. The specific syntax elements for this example are described in more detail below with respect to video decoder 30 in FIG. 3.

Figure 3:
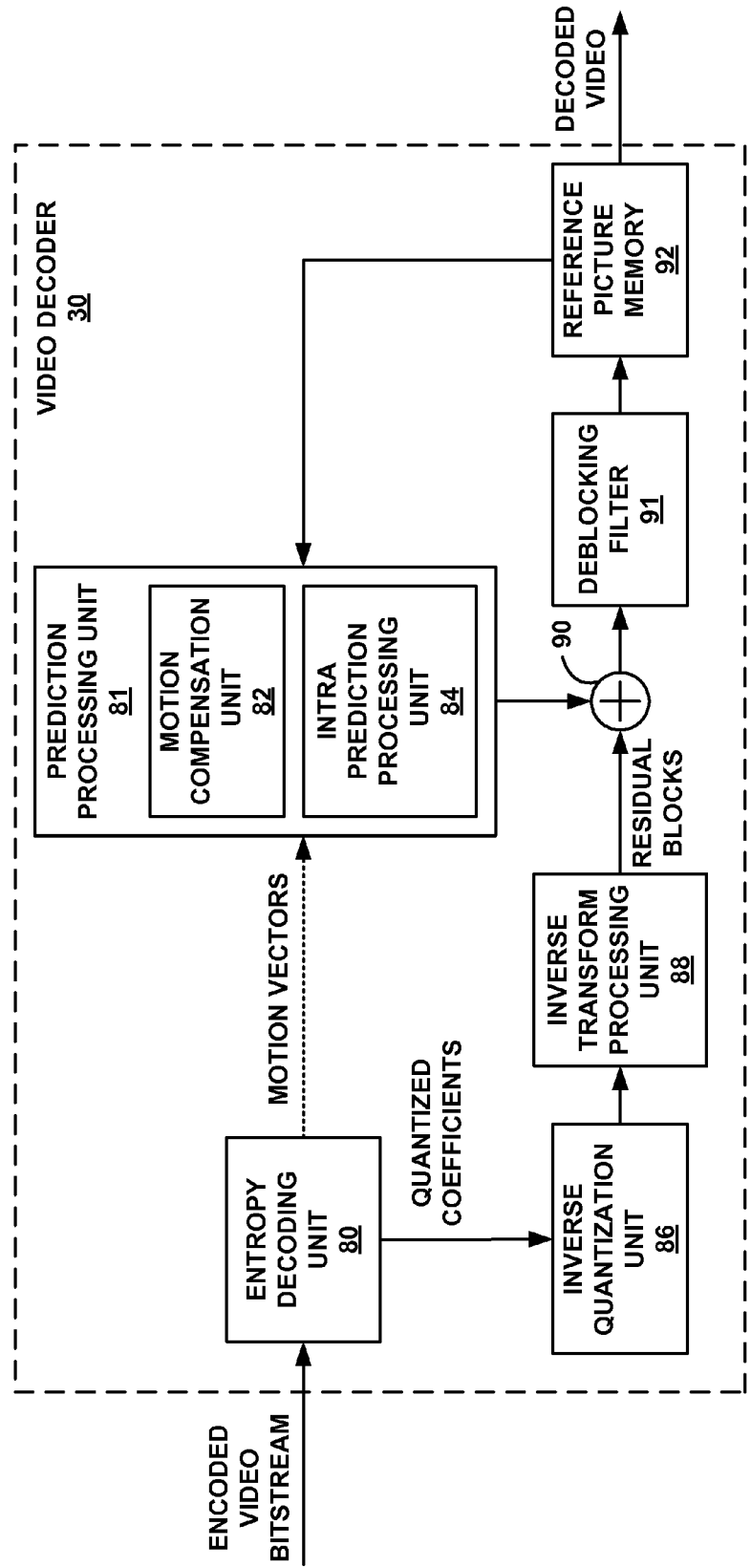
FIG. 3 is a block diagram illustrating an example of a video decoder that may implement the techniques described in this disclosure to decode deblocking filter parameters used to define deblocking filters applied to video slices.

FIG. 3 is a block diagram illustrating an example of a video decoder 30 that may implement the techniques described in this disclosure to decode deblocking filter parameters used to define deblocking filters applied to video slices. In the example of FIG. 3, video decoder 30 includes an entropy decoding unit 80, a prediction processing unit 81, an inverse quantization unit 86, an inverse transform processing unit 88, a summer 90, a deblocking filter 91, and a reference picture memory 92. Prediction processing unit 81 includes motion compensation unit 82 and intra prediction processing unit 84. Video decoder 30 may, in some examples, perform a decoding pass generally reciprocal to the encoding pass described with respect to video encoder 20 from FIG. 2.

During the decoding process, video decoder 30 receives an encoded video bitstream that represents video blocks of an encoded video slice and associated syntax elements from video encoder 20. When the represented video blocks in the bitstream include compressed video data, entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at a sequence level, a picture level, a slice level and/or a video block level. In some cases, entropy decoding unit 80 decodes deblocking filter control syntax elements, including deblocking filter parameters, to define a deblocking filter 91 for a given video slice.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded (i.e., B or P) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. Motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. A deblocking filter 91 is applied to filter the blocks received from summer 90 in order to remove blockiness artifacts. The decoded video blocks in a given picture are then stored in reference picture memory 92, which stores reference pictures used for subsequent motion compensation. Reference picture memory 92 also stores decoded video for later presentation on a display device, such as display device 32 of FIG. 1.

Deblocking filter 91 in video decoder 30 filters certain TU and PU edges of a decoded video block based on a result from a boundary strength computation and deblocking decisions. The boundary strength computation and the deblocking decisions are dependent on threshold values $t_c$ and $\beta$, which may be signaled to video decoder 30 from video encoder 20 using syntax elements. Deblocking filter 91 may alter the values of pixels near a given edge of a video block in order to remove blockiness artifacts perceptible at the edge. Deblocking filter 91 conforms substantially to deblocking filter 63 from FIG. 2 in that deblocking filter 91 may be configured to perform any or all of the techniques described with respect to deblocking filter 63. The deblocking process is described in more detail below with respect to deblocking filter 100 illustrated in FIG. 4.

In accordance with the techniques of this disclosure, entropy decoding unit 80 in video decoder 30 decodes deblocking filter control syntax elements included in the bitstream received from video encoder 20. The deblocking filter control syntax elements include deblocking filter parameters that indicate whether deblocking filtering is enabled or disabled and, if enabled, deblocking filter parameter offsets for threshold values $t_c$ and $\beta$. Video encoder 30 determines the deblocking filter parameters to be used for deblocking filter 91 from the deblocking filter control syntax elements included in the bitstream. Video decoder 30 then defines deblocking filter 91 based on the deblocking filter parameters to operate the same or similar to deblocking filter 63 in video encoder 20 in order to decode the video blocks in the bitstream.

This disclosure describes techniques for signaling, with reduced bitstream overhead, deblocking filter parameters used to define deblocking filter 91 for a current slice of video data. Deblocking filter parameters may be coded in one or more of a picture layer parameter set and a slice header for signaling to video decoder 30. The picture layer parameter set may comprise either a picture parameter set (PPS) or an adaptation parameter set (APS). The PPS is a picture layer parameter set that contains data unlikely to change between pictures that refer to the PPS. The APS is a picture layer parameter set intended for use with picture-adaptive data that is likely to change from picture to picture.

Entropy decoding unit 80 of video encoder 30 decodes a first syntax element defined to indicate whether deblocking filter parameters are present in both a picture layer parameter set and a slice header for pictures referring to the picture layer parameter set. According to the techniques described in this invention, entropy decoding unit 80 only decodes a second syntax element in the slice header when deblocking filter parameters are present in both the picture layer parameter set and the slice header.

When deblocking filter parameters are not present in both the picture layer parameter set and the slice header, entropy decoding unit 80 determines that a second syntax element defined to indicate which set of deblocking filter parameters to use to define deblocking filter 91 for a current video slice is not present in the slice header to be decoded. In the case where deblocking filter parameters are only present in one of the picture layer parameter set or the slice header, deblocking filter 91 is defined for the current video slice based on the set of deblocking filter parameters that are present in either the picture layer parameter set or the slice header. The second syntax element, therefore, is unnecessary because video decoder 30 does not need to decide which set of deblocking filter parameters to use to define deblocking filter 91 in video decoder 30.

When the deblocking filter parameters are present in both the picture layer parameter set and the slice header, entropy decoding unit 80 decodes the second syntax element in the slice header defined to indicate whether to use a first set of deblocking parameters included in the picture layer parameter set or a second set of deblocking parameters included in the slice header. In this case, deblocking filter 91 is defined for the current video slice based on one of the first set or the second set of deblocking parameters. The second syntax element, therefore, is necessary so that video decoder 30 knows which set of deblocking filter parameters to use to define deblocking filter 91 to be the same or similar to deblocking filter 63 in video encoder 20.

In some cases, entropy decoding unit 80 may also decode a control present syntax element defined to indicate whether any deblocking filter control syntax elements are present in either the picture layer parameter set or the slice header. The control present syntax element may be decoded from the picture layer parameter set or from a higher-layer parameter set, e.g., a sequence parameter set (SPS). The deblocking filter control syntax elements comprise the first and second syntax elements described above. Entropy decoding unit 80, therefore, decodes the control present syntax element prior to decoding the first syntax element. If the control present syntax element indicates that no deblocking filter control syntax elements are present, video decoder 30 knows that it does not need to decode the first or second syntax elements because the first and second syntax elements are not present in the bitstream to be decoded. In this case, video decoder 30 may use default deblocking filter parameters to define deblocking filter 91 applied to the decoded video blocks.

In other cases, entropy decoding unit 80 may decode a deblocking filter enabled syntax element defined to indicate whether deblocking filter 91 is enabled for one or more pictures of a video sequence prior to decoding the first syntax element. The deblocking filter enabled syntax element may be decoded from a higher-layer parameter set, e.g., a sequence parameter set (SPS). If deblocking filter 91 is disabled for the video sequence, video decoder 30 knows that it does not need to decode the first or second syntax elements because deblocking filter 91 is not applied to the decoded video blocks. In this case, video decoder 30 also does not need to decode a control present syntax element.

In one example, the first syntax element comprises an override enabled flag coded in a PPS for a given picture. In this case, a first set of deblocking filter parameters is coded in the PPS and the override enabled flag indicates whether a second set of deblocking filter parameters is present in a slice header for one or more slices of the given picture that could be used to override the parameters from the PPS. In addition, the second syntax element comprises an override flag that may be coded in the slice header. When the override enabled flag in the PPS indicates that the second set of deblocking filter parameters is present in the slice header, entropy decoding unit 80 decodes the override flag to determine whether to use the first set of deblocking filter parameters in the PPS or to override the first set of deblocking filter parameters with the second set of deblocking filter parameters included in the slice header to define deblocking filter 91. Otherwise, when the override enabled flag in the PPS indicates that only the first set of deblocking filter parameters in the PPS is present, entropy decoding unit 80 determines that the override flag is not present in the slice header to be decoded.

Table 1 provides an exemplary portion of the PPS syntax including an override enabled flag, i.e., deblocking_filter_override_enabled_flag, and a control present syntax element, i.e., deblocking_filter_control_present_flag.

TABLE 1

| PPS Syntax with override enabled flag | |
|---|---|
| pic_parameter_set_rbsp( ) { | Descriptor |
| ... | |
|   deblocking_filter_control_present_flag | u(1) |
|   if( deblocking_filter_control_present_flag ) { | |
|     deblocking_filter_override_enabled_flag | u(1) |
|     pic_disable_deblocking_filter_flag | u(1) |
|     if( !pic_disable_deblocking_filter_flag ) { | |
|       beta_offset_div2 | se(v) |
|       tc_offset_div2 | se(v) |
|     } | |
|   } | |
| ... | |

Semantics for the PPS syntax of Table 1 are defined as follows. The deblocking_filter_control_present_flag equal to 1 specifies the presence of deblocking filter control syntax elements in the picture parameter set and in the slice header for pictures referring to the picture parameter set. The deblocking_filter_control_present_flag equal to 0 specifies the absence of deblocking filter control syntax elements in the picture parameter set and in the slice header for pictures referring to the picture parameter set.

The deblocking_filter_override_enabled_flag equal to 1 specifies the presence of a deblocking_filter_override_flag in the slice header for pictures referring to the picture parameter set. The deblocking_filter_override_enabled_flag equal to 0 specifies the absence of the deblocking_filter_override_flag in the slice header for pictures referring to the picture parameter set. When not present, the value of the deblocking_filter_override_enabled_flag is inferred to be equal to 0.

The pic_disable_deblocking_filter_flag equal to 1 specifies that the operation of the deblocking filter shall not be applied for pictures referring to the picture parameter set when deblocking_filter_override_enabled_flag is equal to 0. The pic_disable_deblocking_filter_flag equal to 0 specifies that the operation of the deblocking filter shall be applied for pictures referring to the picture parameter set when the deblocking_filter_override_enabled_flag is equal to 0. When not present, the value of the pic_disable_deblocking_filter_flag is inferred to be equal to 0.

The beta_offset_div2 and tc_offset_div2 syntax elements specify the default deblocking parameter offsets for β and $t_c$ (divided by 2) that are applied for pictures referring to the picture parameter set unless the default deblocking parameter offsets are overridden by the deblocking parameter offsets present in the slice segment header for pictures referring to the picture parameter set. The values of the beta_offset_div2 and tc_offset_div2 syntax elements shall both be in the range of −6 to 6, inclusive. When not present, the value of the beta_offset_div2 and tc_offset_div2 syntax elements is inferred to be equal to 0.

Table 2 provides an exemplary portion of the slice header syntax including an override flag, i.e., deblocking_filter_override_flag, that is conditionally coded based on the override enabled flag and the control present syntax element in the PPS syntax.

TABLE 2

Slice Header Syntax with override flag

| slice_segment_header( ) { | Descriptor |
|---|---|
| ... | |
|   if( deblocking_filter_control_present_flag ) { | |
|     if( deblocking_filter_override_enabled_flag ) | |
|       deblocking_filter_override_flag | u(1) |
|     if( deblocking_filter_override_flag ) { | |
|       slice_disable_deblocking_filter_flag | u(1) |
|       if( !slice_disable_deblocking_filter_flag ) { | |
|         beta_offset_div2 | se(v) |
|         tc_offset_div2 | se(v) |
|       } | |
|     } | |
|   } | |
| ... | |

Semantics for the slice header syntax of Table 2 are defined as follows. The deblocking_filter_override_flag equal to 0 specifies that deblocking parameters from the active picture parameter set are used for deblocking the current slice. The deblocking_filter_override_flag equal to 1 specifies that deblocking parameters from the slice segment header are used for deblocking the current slice. When not present, the value of the deblocking_filter_override_flag is inferred to be equal to 0.

The slice_disable_deblocking_filter_flag equal to 1 specifies that the operation of the deblocking filter is not applied for the current slice. The slice_disable_deblocking_filter_flag equal to 0 specifies that the operation of the deblocking filter is applied for the current slice. When the slice_disable_deblocking_filter_flag is not present, it is inferred to be equal to the pic_disable_deblocking_filter_flag in the PPS syntax.

The beta_offset_div2 and tc_offset_div2 syntax elements specify the deblocking parameter offsets for β and $t_c$ (divided by 2) for the current slice. The values of the beta_offset_div2 and tc_offset_div2 syntax elements shall be in the range of −6 to 6, inclusive.

In another example, the first syntax element comprises an inherit enabled flag coded in a SPS and/or an APS for a given picture. In this case, a second set of deblocking filter parameters is coded in the slice header and the inherit enabled flag indicates whether a first set of deblocking filter parameters is present in the APS that could be inherited by the slice header. The second syntax element comprises an inherit flag that may be coded in the slice header. When the inherit enabled flag in the SPS and/or the APS indicates that the first set of deblocking filter parameters is present in the APS, entropy decoding unit 80 decodes the inherit flag to determine whether to use the second set of deblocking filter parameters in the slice header or to inherit the first set of deblocking filter parameters in the APS to define deblocking filter 91. Otherwise, when the inherit enabled flag in the SPS and/or the APS indicates that only the second set of deblocking filter parameters in the slice header is present, entropy decoding unit 80 determines that the inherit flag is not present in the slice header to be decoded.

Signaling deblocking filter parameters to a video decoder was proposed in A. Norkin, "BoG report on resolving deblocking filter description issues," 7th JCT-VC Meeting, Geneva, CH, November 2011, Doc. JCT-VC G1035_r1+ update. Table 3 provides an example of the SPS syntax including an inherit enabled flag, i.e., deblocking_filter_in_aps_enabled_flag.

TABLE 3

SPS syntax with inherit enabled flag

| seq_parameter_set_rbsp( ) { | Descriptor |
|---|---|
|   profile_idc | u(8) |
|   (omitted) | |
|   chroma_pred_from_luma_enabled_flag | u(1) |
|   deblocking_filter_in_aps_enabled_flag | u(1) |
|   loop_filter_across_slice_flag | u(1) |
|   sample_adaptive_offset_enabled_flag | u(1) |
|   adaptive_loop_filter_enabled_flag | u(1) |
|   pcm_loop_filter_disable_flag | u(1) |
|   cu_qp_delta_enabled_flag | u(1) |
|   temporal_id_nesting_flag | u(1) |
|   inter_4x4_enabled_flag | u(1) |
|   rbsp_trailing_bits( ) | |
| } | |

Table 4 provides an example of the APS syntax including an inherit enabled flag, i.e., aps_deblocking_filter_flag.

TABLE 4

APS syntax with inherit enabled flag

| aps_rbsp( ) { | Descriptor |
|---|---|
|   aps_id | ue(v) |
|   aps_deblocking_filter_flag | u(1) |
|   aps_sample_adaptive_offset_flag | u(1) |
|   aps_adaptive_loop_filter_flag | u(1) |
|   if( aps_sample_adaptive_offset_flag \|\| | |
|   aps_adaptive_loop_filter_flag ) { | |
|     aps_cabac_use_flag | u(1) |
|     if( aps_cabac_use_flag ) { | |
|       aps_cabac_init_idc | ue(v) |
|       aps_cabac_init_qp_minus26 | se(v) |
|     } | |
|   } | |
|   if (aps_deblocking_filter_flag){ | |
|     disable_deblocking_filter_flag | u(1) |
|     if (!disable_deblocking_filter_flag) { | |
|       beta_ offset_div2 | se(v) |
|       tc_offset_div2 | se(v) |
|     } | |
|   } | |
|   if( aps_sample_adaptive_offset_flag ) { | |
|     sao_data_byte_count | u(8) |
|     byte_align( ) | |
|     sao_param( ) | |
|     byte_align( ) | |
|   } | |
|   if( aps_adaptive_loop_filter_flag ) { | |
|     alf_data_byte_count | u(8) |
|     byte_align( ) | |
|     alf_param( ) | |
|   } | |
|   rbsp_trailing_bits( ) | |
| } | |

Semantics for the SPS and APS syntax of Tables 3 and 4 are defined as follows. The deblocking_filter_in_aps_enabled_flag in the SPS equal to 0 means deblocking filter parameters are present in the slice header, and equal to 1 means deblocking filter parameters are present in the APS. The aps_deblocking_filter_flag in the APS is equal to the deblocking_filter_in_aps_enabled_flag in the SPS. The aps_deblocking_filter_flag indicates that deblocking filter parameters are present in the APS (equal to 1) or not present in the APS (equal to 0).

One issue with the signaling of deblocking filter parameters is that the inherit flag is signaled in the slice header even when deblocking filter parameters are not present in the APS. As described above, when deblocking filter parameters are only present in the slice header and not present in the APS, the deblocking filter is defined based on the present deblocking filter parameters in the slice header and the inherit flag is unnecessary. Table 5 provides an exemplary portion of the slice header syntax including an inherit flag, i.e., inherit_dbl_params_from_APS_flag, that is conditionally coded based on the inherit enabled flags in the APS syntax and the SPS syntax.

TABLE 5

Slice header syntax with inherit flag

| slice_header( ) { | Descriptor |
|---|---|
| ... | u(v) |
| if( !entropy_slice_flag ) { | |
|   slice_qp_delta | se(v) |
|   if (deblocking_filter_in_aps_enabled_flag && | |
|   aps_deblocking_filter_flag) { | |
|     inherit_dbl_params_from_APS_flag | u(1) |
| /* Note that inherit_dbl_params_from_APS_flag = 0 is inferred if deblocking_filter_in_aps_enabled_flag = 0 or aps_deblocking_filter_flag=0. */ | |
|   } | |
|   if (!inherit_dbl_params_from_APS_flag){ | |
|     disable_deblocking_filter_flag | u(1) |
|     if (!disable_deblocking_filter_flag) { | |
|       beta_offset_div2 | se(v) |
|       tc_offset_div2 | se(v) |
|     } | |
|   } | |
| } | |
| ... | |

As an alternative, Table 6 provides an exemplary portion of the slice header syntax including the inherit flag, i.e., inherit_dbl_params_from_APS_flag, that is conditionally coded based on the inherit enabled flag in the SPS syntax.

TABLE 6

Slice header syntax with inherit flag

| slice_header( ) { | Descriptor |
|---|---|
| ... | u(v) |
| if( !entropy_slice_flag ) { | |
|   slice_qp_delta | se(v) |
|   if (deblocking_filter_in_aps_enabled_flag) { | |
|     inherit_dbl_params_from_APS_flag | u(1) |
| /* Note that inherit_dbl_params_from_APS_flag = 0 is inferred if deblocking_filter_in_aps_enabled_flag = 0. */ | |
|   } | |
|   if (!inherit_dbl_params_from_APS_flag){ | |
|     disable_deblocking_filter_flag | u(1) |
|     if (!disable_deblocking_filter_flag) { | |
|       beta_offset_div2 | se(v) |
|       tc_offset_div2 | se(v) |
|     } | |
|   } | |
| } | |
| ... | |

Semantics for the slice header syntax of Tables 5 and 6 are defined as follows. The disable_deblocking_filter_flag equal to 0 means that the deblocking filter is enabled, and equal to 1 means that the deblocking filter is disabled. The beta_offset_div2 and tc_offset_div2 syntax elements indicate deblocking parameter offsets for $t_c$ and $\beta$ (divided by 2). The inherit_dbl_params_from_APS_flag equal to 1 means that deblocking filter parameters present in the APS shall be used, and equal to 0 means that deblocking filter parameters that follow in the slice header shall be used.

A second issue with the signaling of deblocking filter parameters is that no SPS level enable/disable flag is defined to indicate whether the deblocking filter is enabled for pictures of the video sequence. When the deblocking filter is disabled, no deblocking filter parameters are needed to define the deblocking filter and coding the deblocking filter parameters is unnecessary. Table 7 provides an example of the SPS syntax including the inherit enabled flag, i.e., deblocking_in_aps_enabled_flag, conditionally coded based on a deblocking filter enabled flag, i.e., deblocking_filter_enabled_flag.

TABLE 7

SPS syntax with deblocking filter enabled flag and inherit enabled flag

| seq_parameter_set_rbsp( ) { | Descriptor |
|---|---|
|   profile_idc | u(8) |
|   (omitted) | |
|   chroma_pred_from_luma_enabled_flag | u(1) |
|   deblocking_filter_enabled_flag | u(1) |
|   if (deblocking_filter_enable_flag) { | |
|     deblocking_filter_in_aps_enabled_flag | u(1) |
| /* Note that if deblocking_filter_enabled_flag=0, then deblocking_filter_in_aps_enabled_flag=0 and aps_deblocking_filter_flag=0 and disable_deblocking_filter_flag=1 are inferred */ | |
|   } | |
|   loop_filter_across_slice_flag | u(1) |
|   sample_adaptive_offset_enabled_flag | u(1) |
|   adaptive_loop_filter_enabled_flag | u(1) |
|   pcm_loop_filter_disable_flag | u(1) |
|   cu_qp_delta_enabled_flag | u(1) |
|   temporal_id_nesting_flag | u(1) |
|   inter_4x4_enabled_flag | u(1) |
|   rbsp_trailing_bits( ) | |
| } | |

Semantics for the SPS syntax of Table 7 are defined as follows. The deblocking_filter_enabled_flag equal to 0 means that the deblocking filter is disabled, and equal to 1 means that the deblocking filter is enabled.

In this way, when the deblocking filter is disabled at the SPS level, it may be inferred that no deblocking parameters are signaled in the APS (i.e., the deblocking_filter_in_aps_enabled_flag in the SPS is equal to 0 and the aps_deblocking_filter_flag in the APS is equal to 0). In addition, when the deblocking filter is disabled at the SPS level, it may be inferred that the disable_deblocking_filter_flag in the slice header is equal to 1, indicating that the deblocking filter is disabled at the slice level.

Table 8 provides an example of the APS syntax in which the inherit enabled flag, i.e., aps_deblocking_filter_flag, is inferred to be equal to 0 when the deblocking filter is disabled at the SPS level.

TABLE 8

APS syntax with inherit enabled flag

| aps_rbsp( ) { | Descriptor |
|---|---|
|   aps_id | ue(v) |
|   aps_deblocking_filter_flag | u(1) |
|   aps_sample_adaptive_offset_flag | u(1) |
|   aps_adaptive_loop_filter_flag | u(1) |
|   if( aps_sample_adaptive_offset_flag ‖ aps_adaptive_loop_filter_flag ) { | |
|     aps_cabac_use_flag | u(1) |
|     if( aps_cabac_use_flag ) { | |
|       aps_cabac_init_idc | ue(v) |
|       aps_cabac_init_qp_minus26 | se(v) |
|     } | |
|   } | |
|   if (aps_deblocking_filter_flag){ | |
|     disable_deblocking_filter_flag | u(1) |

TABLE 8-continued

APS syntax with inherit enabled flag

| aps_rbsp( ) { | Descriptor |
|---|---|
|     if (!disable_deblocking_filter_flag) { | |
|         beta_offset_div2 | se(v) |
|         tc_offset_div2 | se(v) |
|     } | |
|   } | |
| ... | |

Table 9 provides an exemplary portion of the slice header syntax including the deblocking filter parameters that are conditionally coded based on the deblocking filter enabled flag, i.e., deblocking_filter_enabled_flag, in the SPS syntax.

TABLE 9

Slice header syntax with inherit flag and conditionally coded deblocking filter parameters

| slice_header( ) { | Descriptor |
|---|---|
|   entropy_slice_flag | u(1) |
|   if( !entropy_slice_flag ) { | |
|     slice_type | ue(v) |
|     pic_parameter_set_id | ue(v) |
|     if( sample_adaptive_offset_enabled_flag \|\| adaptive_loop_filter_enabled_flag \|\| deblocking_filter_in_aps_enabled_flag ) | |
|       aps_id | ue(v) |
|     frame_num | u(v) |
|     if( IdrPicFlag ) | |
|       idr_pic_id | ue(v) |
|     .... | u(v) |
|   if( !entropy_slice_flag ) { | |
|     slice_qp_delta | se(v) |
|     if (deblocking_filter_in_aps_enabled_flag && aps_deblocking_filter_flag) { | |
|       inherit_dbl_params_from_APS_flag | u(1) |
| /* Note that inherit_dbl_params_from_APS_flag = 0 is inferred if deblocking_filter_in_aps_enabled_flag = 0 or aps_deblocking_filter_flag=0. */ | |
|     } | |
|     if ( (!inherit_dbl_params_from_APS_flag) && deblocking_filter_enabled_flag){ | |
|       disable_deblocking_filter_flag | u(1) |
|       if (!disable_deblocking_filter_flag) { | |
|         beta_offset_div2 | se(v) |
|         tc_offset_div2 | se(v) |
|       } | |
|     } | |
|   } | |
| ..... | |

As an alternative, instead of introducing a condition for coding the deblocking filter parameters in the slice header based on the deblocking filter enabled flag in the SPS, the techniques may infer that no deblocking filter control syntax elements are signaled in the slice header when the deblocking filter is disabled at the SPS level. A control present syntax element, i.e., deblocking_filter_control_present_flag, included in the PPS syntax is defined to indicate whether deblocking filter control syntax elements, including the deblocking filter parameters, are signaled in the slice header. In this case, the deblocking filter parameters are only coded in the slice header when the deblocking filter control syntax elements are signaled in the slice header, which only occurs when the deblocking filter is enabled at the SPS level. The control present syntax element in the PPS is proposed in Bross, W.-J. Han, J.-R. Ohm, G. J. Sullivan, T. Wiegand, "High efficiency video coding (HEVC) text specification draft 6," 8$^{th}$ JCT-VC Meeting, San Jose, Calif., USA, February 2012, which is also referred to as HEVC "Working Draft 6," HEVC WD6, or simply WD6.

Table 10 provides an example of the SPS syntax including the inherit enabled flag conditionally coded based on the deblocking filter enabled flag, and where a control present syntax element, i.e., deblocking_filter_control_present_flag, in the PPS is inferred to be equal to 0 when the deblocking filter is disabled at the SPS level.

TABLE 10

SPS syntax with deblocking filter enabled flag and inherit enabled flag

| seq_parameter_set_rbsp( ) { | Descriptor |
|---|---|
|   profile_idc | u(8) |
|   (omitted) | |
|   chroma_pred_from_luma_enabled_flag | u(1) |
|   deblocking_filter_enabled_flag | u(1) |
|   if (deblocking_filter_enable_flag) { | |
|     deblocking_filter_in_aps_enabled_flag | u(1) |
| Note that if deblocking_filter_enabled_flag=0, then it shall be inferred that deblocking_filter_in_aps_enabled_flag=0 and aps_deblocking_filter_flag=0 and disable_deblocking_filter_flag=1 and deblocking_filter_control_present_flag=0 | |
|   } | |
|   loop_filter_across_slice_flag | u(1) |
|   sample_adaptive_offset_enabled_flag | u(1) |
|   adaptive_loop_filter_enabled_flag | u(1) |
|   pcm_loop_filter_disable_flag | u(1) |
|   cu_qp_delta_enabled_flag | u(1) |
|   temporal_id_nesting_flag | u(1) |
|   inter_4x4_enabled_flag | u(1) |
|   rbsp_trailing_bits( ) | |
| } | |

Table 11 provides an exemplary portion of the slice header syntax including the deblocking filter parameters that are conditionally coded based on the control present syntax element, i.e., deblocking_filter_control_present_flag, in the PPS syntax.

TABLE 11

Slice header syntax with inherit flag and conditionally coded deblocking filter parameters

| slice_header( ) { | Descriptor |
|---|---|
|   slice_type | ue(v) |
|   entropy_slice_flag | u(1) |
|   if( !entropy_slice_flag ) { | |
|     pic_parameter_set_id | ue(v) |
|     if(scaling_list_enable_flag \|\| deblocking_filter_in_aps_enabled_flag \|\| (sample_adaptive_offset_enabled_flag && !slice_sao_interleaving_flag) \|\| adaptive_loop_filter_enabled_flag ) | |
|       aps_id | ue(v) |
|   .... | |
|   if( !entropy_slice_flag ) { | |
|     slice_qp_delta | se(v) |
|     if( deblocking_filter_control_present_flag ) { | |
|       if (deblocking_filter_in_aps_enabled_flag) { | |
|         inherit_dbl_params_from_APS_flag | u(1) |
| /* Note that inherit_dbl_params_from_APS_flag = 0 is inferred if deblocking_filter_in_aps_enabled_flag = 0. */ | |
|       } | |
|       if ( (!inherit_dbl_params_from_APS_flag) { | |
|         disable_deblocking_filter_flag | u(1) |
|         if (!disable_deblocking_filter_flag) { | |
|           beta_offset_div2 | se(v) |
|           tc_offset_div2 | se(v) |
|         } | |
|       } | |
|     } | |
|   } | |
| ..... | |

The difference between the example described with respect to Tables 10 and 11 and the example described with respect to Tables 7-9 is that when the deblocking_filter_enable_flag in the SPS is equal to 0, the deblocking_filter_control_present_flag in the PPS is also inferred to be equal to 0. In this way, the result of the deblocking filter being disabled at the SPS level is that no deblocking filter parameters will be signaled in the APS or the slice header, and that the deblocking filter is effectively disabled at the slice level. More specifically, when the deblocking filter is disabled at the SPS level, video decoder 30 may infer that no deblocking filter parameters are present in the APS (i.e., the deblocking_filter_in_aps_enabled_flag in the SPS is equal to 0 and the aps_deblocking_filter_flag in the APS is equal to 0) and that no deblocking filter parameters are signaled in the slice header (i.e., the deblocking_filter_control_present_flag in the PPS is equal to 0). In addition, video decoder 30 may infer that the disable_deblocking_filter_flag in the slice header is equal to 1, indicating that the deblocking filter is disabled at the slice level. In this case, no additional conditions may need to be added in the slice header syntax because, when the deblocking_filter_control_present_flag in the PPS is equal to 0, none of the deblocking filter parameters are signaled in the slice header.

A third issue with the signaling of deblocking filter parameters is that no SPS level flag is defined to indicate when no deblocking filter control syntax elements are signaled and default parameters, such as zero values, should be used to define the deblocking filter. When no deblocking filter control syntax elements are signaled in either the APS or the slice header, no deblocking filter parameters are signaled to define the deblocking filter. Table 12 provides an example of the SPS syntax including the inherit enabled flag, i.e., deblocking_in_aps_enabled_flag, conditionally coded based on a control present syntax element, i.e., deblocking_filter_control_present_flag.

TABLE 12

SPS syntax with control present syntax element and conditionally coded inherit enabled flag

| seq_parameter_set_rbsp( ) { | Descriptor |
|---|---|
| profile_idc | u(8) |
| (omitted) | |
| chroma_pred_from_luma_enabled_flag | u(1) |
| deblocking_filter_control_present_flag | u(1) |
| if (deblocking_filter_control_present_flag) { | |
|     deblocking_filter_in_aps_enabled_flag | u(1) |
| /* Note that if deblocking_filter_control_present_flag=0, then deblocking_filter_in_aps_enabled_flag=0 and aps_deblocking_filter_flag=0 and disable_deblocking_filter_flag=0 and beta_offset_div2=0 and tc_offset_div2=0 are inferred */ | |
| } | |
| loop_filter_across_slice_flag | u(1) |
| sample_adaptive_offset_enabled_flag | u(1) |
| adaptive_loop_filter_enabled_flag | u(1) |
| pcm_loop_filter_disable_flag | u(1) |
| cu_qp_delta_enabled_flag | u(1) |
| temporal_id_nesting_flag | u(1) |
| inter_4x4_enabled_flag | u(1) |
| rbsp_trailing_bits( ) | |
| } | |

Table 13 provides an example of the APS syntax in which the inherit enabled flag, i.e., aps_deblocking_filter_flag, is inferred to be equal to 0 when no deblocking filter control syntax elements are present in either the APS or the slice header, i.e., when deblocking_filter_control_present_flag in the SPS syntax is equal to 0.

TABLE 13

APS syntax with inherit enabled flag

| aps_rbsp( ) { | Descriptor |
|---|---|
| aps_id | ue(v) |
| aps_deblocking_fliter_flag | u(1) |
| aps_sample_adaptive_offset_flag | u(1) |
| aps_adaptive_loop_filter_flag | u(1) |
| if( aps_sample_adaptive_offset_flag \|\| aps_adaptive_loop_filter_flag ) { | |
|     aps_cabac_use_flag | u(1) |
|     if( aps_cabac_use_flag ) { | |
|         aps_cabac_init_idc | ue(v) |
|         aps_cabac_init_qp_minus26 | se(v) |
|     } | |
| } | |
| if (aps_deblocking_filter_flag){ | |
|     disable_deblocking_fliter_flag | u(1) |
|     if (!disable_deblocking_filter_flag) { | |
|         beta_offset_div2 | se(v) |
|         tc_offset_div2 | se(v) |
|     } | |
| } | |
| .... | |

Table 14 provides an example of the slice header syntax including the deblocking filter parameters that are conditionally coded based on the control present syntax element, i.e., deblocking_filter_control_present_flag, in the SPS syntax.

TABLE 14

Slice header syntax with inherit flag and conditionally coded deblocking filter parameters

| slice_header( ) { | Descriptor |
|---|---|
| entropy_slice_flag | u(1) |
| if( !entropy_slice_flag ) { | |
|     slice_type | ue(v) |
|     pic_parameter_set_id | ue(v) |
|     if( sample_adaptive_offset_enabled_flag \|\| adaptive_loop_filter_enabled_flag \|\| deblocking_filter_in_aps_enabled_flag ) | |
|         aps_id | ue(v) |
|     frame_num | u(v) |
|     if( IdrPicFlag ) | |
|         idr_pic_id | ue(v) |
|     .... | u(v) |
| if( !entropy_slice_flag ) { | |
|     slice_qp_delta | se(v) |
|     if (deblocking_filter_in_aps_enabled_flag && aps_deblocking_filter_flag) { | |
|         inherit_dbl_params_from_APS_flag | u(1) |
| /* Note that inherit_dbl_params_from_APS_flag = 0 is inferred if deblocking_filter_in_aps_enabled_flag = 0 or aps_deblocking_filter_flag=0. */ | |
|     } | |
|     if ( (!inherit_dbl_params_from_APS_flag) && deblocking_filter_control_present_flag){ | |
|         disable_deblocking_filter_flag | u(1) |
|         if (!disable_deblocking_filter_flag) { | |
|             beta_offset_div2 | se(v) |
|             tc_offset_div2 | se(v) |
|         } | |
|     } | |
| ..... | |

Figure 4:
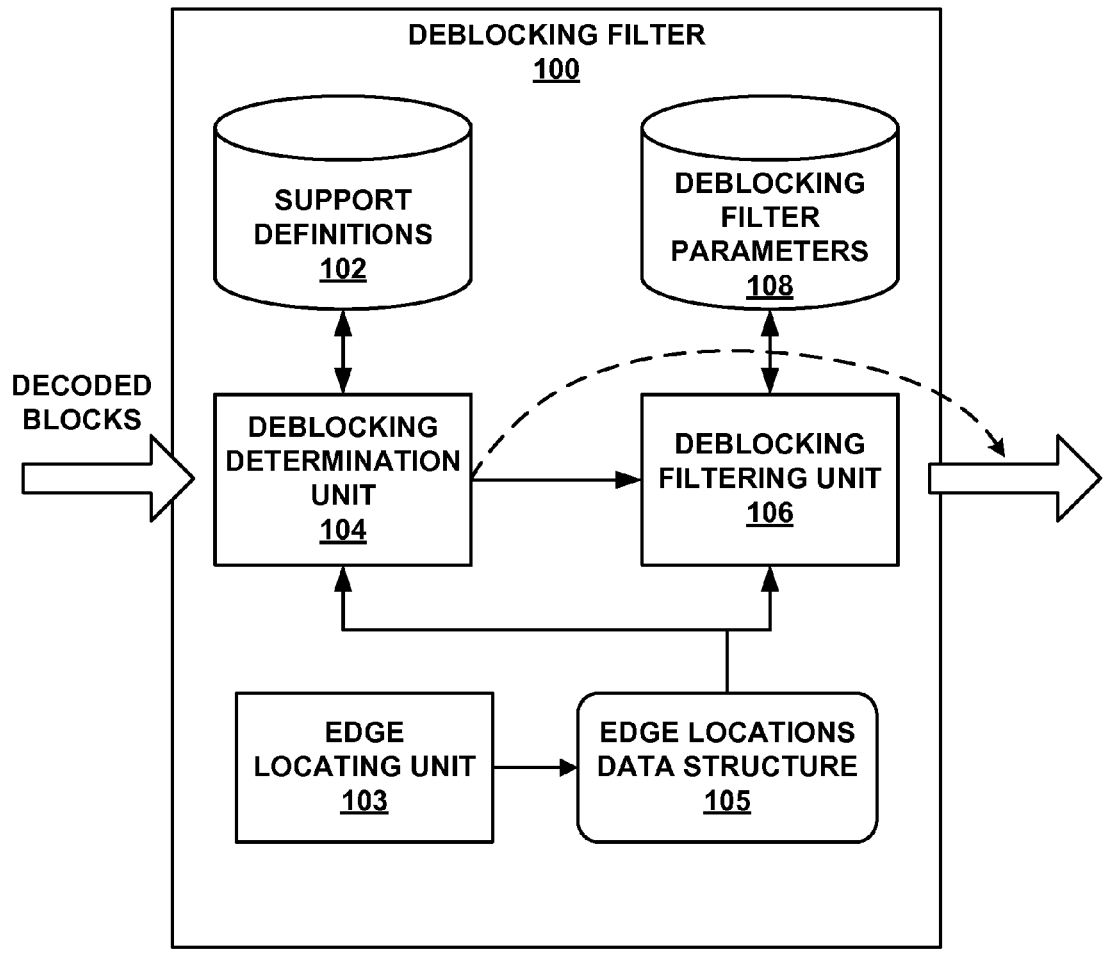
FIG. 4 is a block diagram illustrating components of an exemplary deblocking filter defined based on the deblocking filter parameters signaled according to the techniques described in this disclosure.

FIG. 4 is a block diagram illustrating components of an exemplary deblocking filter 100 defined based on deblocking filter parameters signaled according to the techniques described in this disclosure. In general, either or both of deblocking filter 63 from FIG. 2 and deblocking filter 91 from FIG. 3 may include components substantially similar to those of deblocking filter 100. Other video coding devices, such as video encoders, video decoders, video encoder/decoders (CODECs), and the like may also include components substantially similar to deblocking filter 100. Deblocking filter 100 may be implemented in hardware, software, or firmware, or any combination thereof. When implemented in software or firmware, corresponding hardware (such as one or more processors or processing units and memory for storing instructions for the software or firmware) may also be provided.

In the example of FIG. 4, deblocking filter 100 includes deblocking determination unit 104, support definitions 102 stored in memory, deblocking filtering unit 106, deblocking filter definitions 108 stored in memory, edge locating unit 103, and edge locations data structure 105. Any or all of the components of deblocking filter 100 may be functionally integrated. The components of deblocking filter 100 are illustrated separately only for purposes of illustration. In general, deblocking filter 100 receives data for decoded blocks, e.g., from a summation component that combines prediction data with residual data for the blocks. The data may further include an indication of how the blocks were predicted. In the example described below, deblocking filter 100 is configured to receive data including a decoded vide block associated with a LCU and a CU quadtree for the LCU, where the CU quadtree describes how the LCU is partitioned into CUs and prediction modes for PUs and TUs of leaf-node CUs.

Deblocking filter 100 may maintain edge locations data structure 105 in a memory of deblocking filter 100, or in an external memory provided by a corresponding video coding device. In some examples, edge locating unit 103 may receive a CU quadtree corresponding to an LCU that indicates how the LCU is partitioned into CUs. Edge locating unit 103 may then analyze the CU quadtree to determine edges between decoded video blocks associated with TUs and PUs of CUs in the LCU that are candidates for deblocking.

Edge locations data structure 105 may comprise an array having a horizontal dimension, a vertical dimension, and a dimension representative of horizontal edges and vertical edges. In general, edges between video blocks may occur between two video blocks associated with smallest-sized CUs of the LCU, or TUs and PUs of the CUs. Assuming that the LCU has a size of N×N, and assuming that the smallest-sized CU of the LCU is of size M×M, the array may comprise a size of [N/M]×[N/M]×2, where "2" represents the two possible directions of edges between CUs (horizontal and vertical). For example, assuming that an LCU has 64×64 pixels and a 8×8 smallest-sized CU, the array may comprise [8]×[8]×[2] entries.

Each entry may generally correspond to a possible edge between two video blocks. Edges might not in fact exist at each of the positions within the LCU corresponding to each of the entries of edge locations data structure 105. Accordingly, values of the data structure may be initialized to false. In general, edge locating unit 103 may analyze the CU quadtree to determine locations of edges between two video blocks associated with TUs and PUs of CUs of the LCU and set corresponding values in edge locations data structure 105 to true.

In general, the entries of the array may describe whether a corresponding edge exists in the LCU as a candidate for deblocking. That is, when edge locating unit 103 determines that an edge between two neighboring video blocks associated with TUs and PUs of CUs of the LCU exists, edge locating unit 103 may set a value of the corresponding entry in edge locations data structure 105 to indicate that the edge exists (e.g., to a value of "true").

Deblocking determination unit 104 generally determines whether, for two neighboring blocks, an edge between the two blocks should be deblocked. Deblocking determination unit 104 may determine locations of edges using edge locations data structure 105. When a value of edge locations data structure 105 has a Boolean value, deblocking determination unit 104 may determine that a "true" value indicates the presence of an edge, and a "false" value indicates that no edge is present, in some examples.

In general, deblocking determination unit 104 is configured with one or more deblocking determination functions. The functions may include a plurality of coefficients applied to lines of pixels that cross the edge between the blocks. For example, the functions may be applied to a line of eight pixels that is perpendicular to the edge, where four of the pixels are in one of the two blocks and the other four pixels are in the other of the two blocks. Support definitions 102 define support for the functions. In general, the "support" corresponds to the pixels to which the functions are applied. Various examples of sets of support are described in greater detail below with respect to FIG. 5.

Deblocking determination unit 104 may be configured to apply one or more deblocking determination functions to one or more sets of support, as defined by support definitions 102, to determine whether a particular edge between two blocks of video data should be deblocked. The dashed line originating from deblocking determination unit 104 represents data for blocks being output without being filtered. In cases where deblocking determination unit 104 determines that an edge between two blocks should not be filtered, deblocking filter 100 may output the data for the blocks without altering the data. That is, the data may bypass deblocking filtering unit 106. On the other hand, when deblocking determination unit 104 determines that an edge should be deblocked, deblocking determination unit 104 may cause deblocking filtering unit 106 to filter values for pixels near the edge in order to deblock the edge.

Deblocking filtering unit 106 retrieves definitions of deblocking filters from deblocking filter parameters 108 for edges to be deblocked, as indicated by deblocking determination unit 104. In general, filtering of an edge uses values of pixels from the neighborhood of a current edge to be deblocked. Therefore, both deblocking decision functions and deblocking filters may have a certain support region on both sides of an edge. By applying a deblocking filter to pixels in the neighborhood of an edge, deblocking filtering unit 106 may smooth the values of the pixels such that high frequency transitions near the edge are dampened. In this manner, application of deblocking filters to pixels near an edge may reduce blockiness artifacts near the edge.

FIG. 5 is a conceptual diagram illustrating pixel positions near an edge 134 of a video block between sub-blocks 130 and 132. As one example, edge 134 may comprise an inner CU edge such as a TU edge between two TUs defined in the CU, or a PU edge between two PUs defined in the CU. Each of the pixel positions is designated using the format $[p|q]I_J$, where p corresponds to sub-block 130 and q corresponds to sub-block 132, I corresponds to a distance from edge 134, and J corresponds to a row indicator from top to bottom of sub-blocks 130 and 132. In some examples, support used for deblocking decision functions and deblocking filters has a line of eight pixels. In such examples, for a given line X where $0 \leq X \leq 7$, each of pixels $p3_X$ to $q3_X$ may be used as support.

Figure 6:
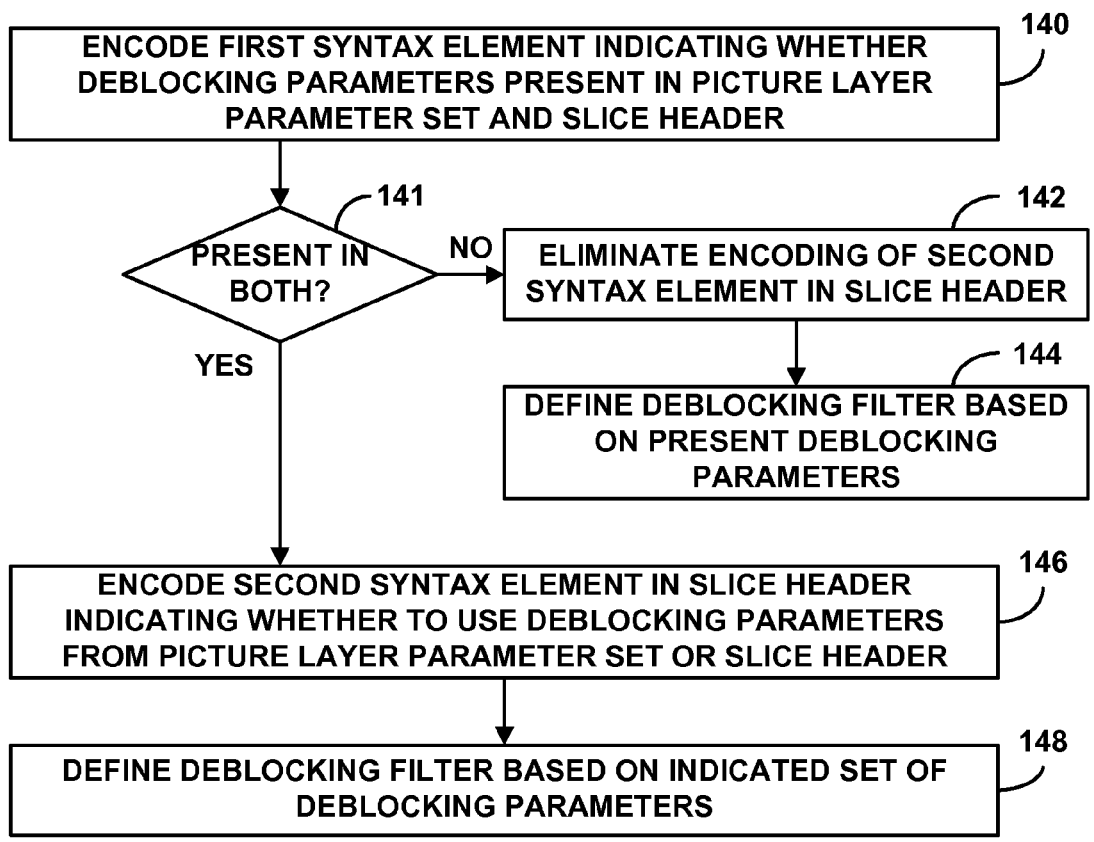
FIG. 6 is a flowchart illustrating an example operation of encoding deblocking filter parameters for a current video slice with reduced bitstream overhead in accordance with the techniques described in this disclosure.

FIG. 6 is a flowchart illustrating an example operation of encoding deblocking filter parameters for a current video slice with reduced bitstream overhead in accordance with the techniques described in this disclosure. The operation illustrated in FIG. 6 is described with respect to video encoder 20 from FIG. 2.

Entropy encoding unit 56 of video encoder 20 encodes a first syntax element defined to indicate whether deblocking filter parameters are present in both a picture layer parameter set and a slice header for pictures referring to the picture layer parameter set (140). If deblocking filter parameters are not present in both the picture layer parameter set and the slice header (NO branch of 141), entropy encoding unit 56 eliminates encoding of a second syntax element in the slice header (142). The second syntax element is defined to indicate which set of deblocking filter parameters to use to define a deblocking filter for a current video slice. In the case where deblocking filter parameters are only present in one of the picture layer parameter set or the slice header, the second syntax element is unnecessary because no decision needs to made regarding which deblocking filter parameters to use to define the deblocking filter. Instead, deblocking filter 63 is defined for the current video slice based on the single set of deblocking filter parameters that are present in either the picture layer parameter set or the slice header (144).

If deblocking filter parameters are present in both the picture layer parameter set and the slice header (YES branch of 141), entropy encoding unit 56 encodes the second syntax element in the slice header, which is defined to indicate whether to use a first set of deblocking parameters included in the picture layer parameter set or a second set of deblocking parameters included in the slice header (146). In this case, deblocking filter 63 is defined for the current video slice based on the indicated set of deblocking parameters (148). According to the techniques described in this disclosure, therefore, deblocking filter parameters are encoded for a current video slice with reduced bitstream overhead by only encoding the second syntax element in the slice header when deblocking filter parameters are present in both the picture layer parameter set and the slice header.

Figure 7:
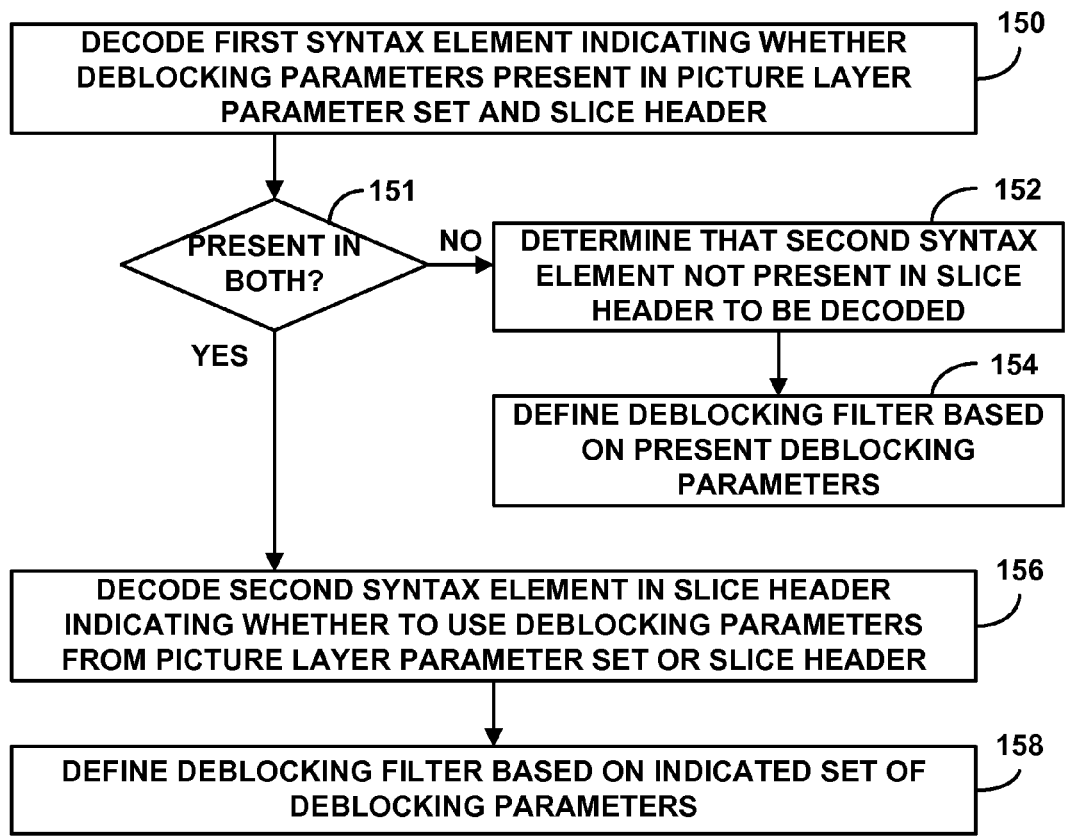
FIG. 7 is a flowchart illustrating an example operation of decoding deblocking filter parameters for a current video slice with reduced bitstream overhead in accordance with the techniques described in this disclosure.

FIG. 7 is a flowchart illustrating an example operation of decoding deblocking filter parameters for a current video slice with reduced bitstream overhead in accordance with the techniques described in this disclosure. The operation illustrated in FIG. 7 is described with respect to video decoder 30 from FIG. 3.

Entropy decoding unit 80 of video decoder 30 decodes a first syntax element configured to indicate whether deblocking filter parameters are present in both a picture layer parameter set and a slice header for pictures referring to the picture layer parameter set (150). If deblocking filter parameters are not present in both the picture layer parameter set and the slice header (NO branch of 151), entropy decoding unit 80 determines that a second syntax element is not present in the slice header to be decoded (152). The second syntax element is defined to indicate which set of deblocking filter parameters to use to define a deblocking filter for a current video slice. In the case where deblocking filter parameters are only present in one of the picture layer parameter set or the slice header, the second syntax element is unnecessary because no decision needs to made regarding which deblocking filter parameters to use to define the deblocking filter. Instead, deblocking filter 91 is defined for the current video slice based on the single set of deblocking filter parameters that are present in either the picture layer parameter set or the slice header (154).

If deblocking filter parameters are present in both the picture layer parameter set and the slice header (YES branch of 151), entropy decoding unit 80 decodes the second syntax element in the slice header, which is defined to indicate whether to use a first set of deblocking parameters included in the picture layer parameter set or a second set of deblocking parameters included in the slice header (156). In this case, deblocking filter 91 is defined for the current video slice based on the indicated set of deblocking parameters (158). According to the techniques described in this disclosure, therefore, deblocking filter parameters are decoded for a current video slice with reduced bitstream overhead by only decoding the second syntax element in the slice header when deblocking filter parameters are present in both the picture layer parameter set and the slice header.

Figure 8:
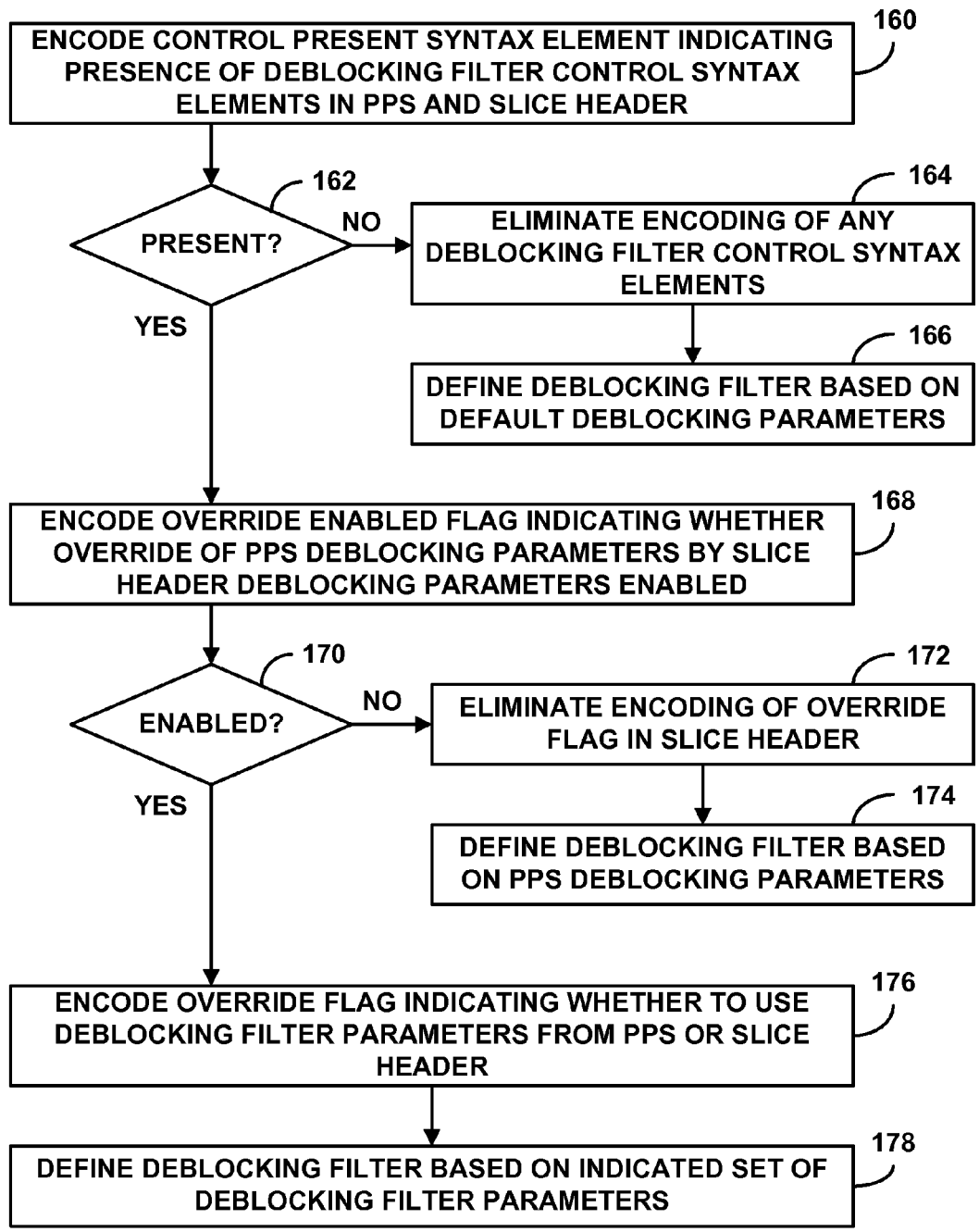
FIG. 8 is a flowchart illustrating an example operation of encoding deblocking filter parameters for a current video slice in a picture parameter set (PPS) that may be overridden by deblocking filter parameters in a slice header.

FIG. 8 is a flowchart illustrating an example operation of encoding deblocking filter parameters for a current video slice in a picture parameter set (PPS) that may be overridden by deblocking filter parameters in a slice header. The operation illustrated in FIG. 8 is described with respect to video encoder 20 from FIG. 2.

Entropy encoding unit 56 encodes a control present syntax element in the PPS defined to indicate whether any deblocking filter control syntax elements are present in the PPS and the slice header (160). The deblocking filter control syntax elements include an override enabled flag signaled in the PPS, an override flag signaled in the slice header, and deblocking filter parameters signaled in the PPS and/or the slice header. When deblocking filter control syntax elements are not present in either the PPS or the slice header (NO branch of 162), entropy encoding unit 56 eliminates encoding any of the deblocking filter control syntax elements (164). In this case, video encoder 20 signals to video decoder 30 that deblocking filter 63 is not defined based on coded deblocking filter parameters. Instead, deblocking filter 63 is defined based on default deblocking filter parameters (166).

When deblocking filter control syntax elements are present in the PPS or the slice header (YES branch of 162), entropy encoding unit 56 encodes an override enabled flag in the PPS that indicates whether an override of a first set of deblocking filter parameters included in the PPS by a second set of deblocking filter parameters included in the slice header is enabled (168).

If the override of the deblocking filter parameters in the PPS is not enabled (NO branch of 170), entropy encoding unit 56 eliminates encoding of an override flag in the slice header (172). The override flag indicates which set of deblocking filter parameters to use to define a deblocking filter for a current video slice. In the case where deblocking filter parameters are only present in the PPS, the override flag in the slice header is unnecessary because no decision needs to be made regarding which deblocking filter parameters to use to define the deblocking filter. Instead, deblocking filter 63 is defined for the current video slice based on the deblocking filter parameters present in the PPS (174).

If the override of the deblocking filter parameters in the PPS by the deblocking parameters in the slice header is enabled (YES branch of 170), entropy encoding unit 56 encodes the override flag in the slice header that indicates whether to use the first set of deblocking filter parameters from the PPS or to override the first set of deblocking filter parameters with the second set of deblocking filter parameters included in the slice header (176). In this case, deblocking filter 63 is defined for the current video slice based on the indicated set of deblocking parameters (178).

Figure 9:
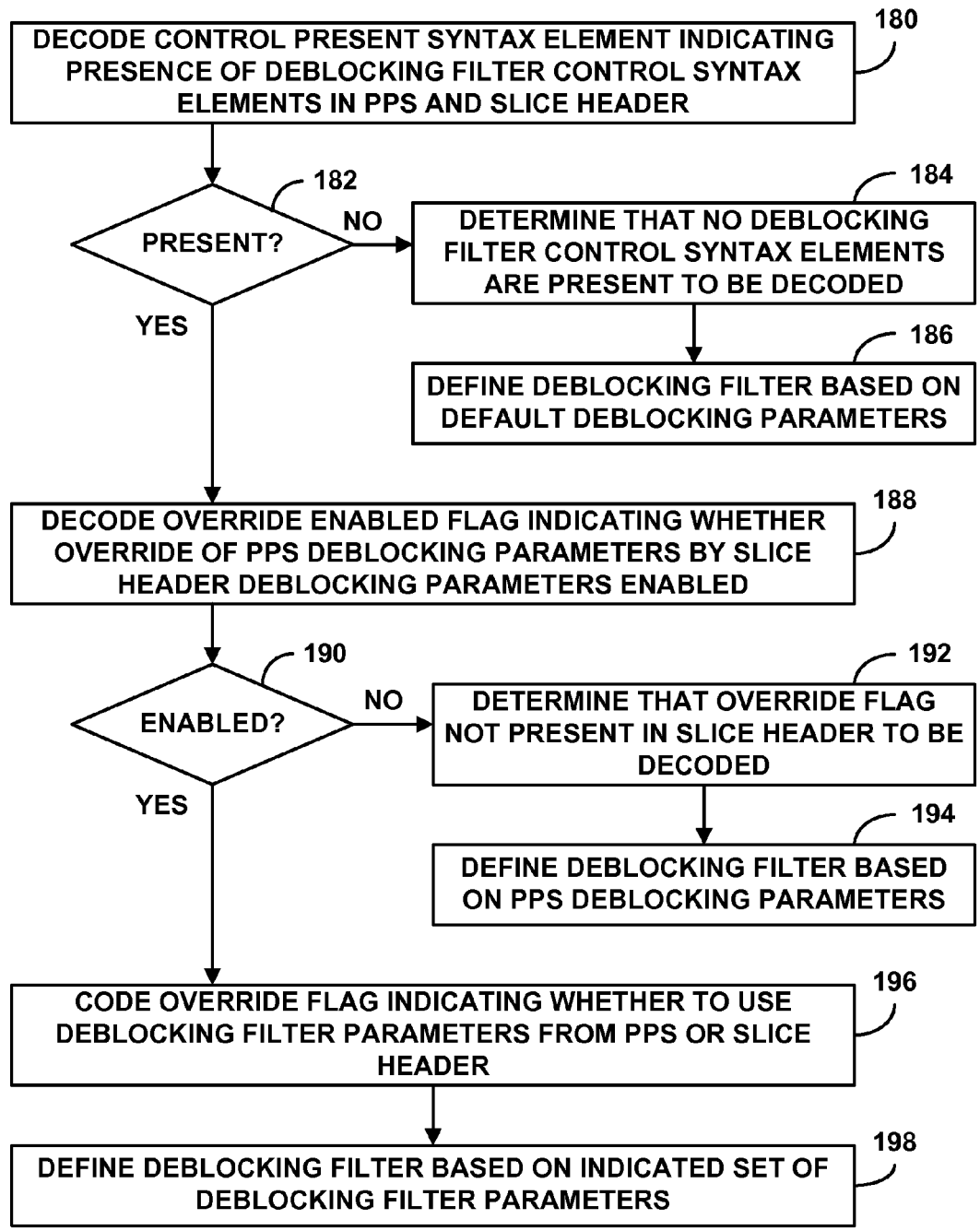
FIG. 9 is a flowchart illustrating an example operation of decoding deblocking filter parameters for a current video slice in a picture parameter set (PPS) that may be overridden by deblocking filter parameters in a slice header.

FIG. 9 is a flowchart illustrating an example operation of decoding deblocking filter parameters for a current video slice in a picture parameter set (PPS) that may be overridden by deblocking filter parameters in a slice header. The operation illustrated in FIG. 9 is described with respect to video decoder 30 from FIG. 3.

Entropy decoding unit 80 decodes a control present syntax element in the PPS defined to indicate whether any deblocking filter control syntax elements are present in the PPS and the slice header (180). The deblocking filter control syntax elements include an override enabled flag signaled in the PPS, an override flag signaled in the slice header, and deblocking filter parameters signaled in the PPS and/or the slice header. When deblocking filter control syntax elements are not present in either the PPS or the slice header (NO branch of 182), entropy decoding unit 80 determines that no deblocking filter control syntax elements are present in the bitstream to be decoded (184). In this case, video decoder 30 knows that deblocking filter 91 is not defined based on coded deblocking filter parameters. Instead, deblocking filter 91 is defined based on default deblocking filter parameters (186).

When deblocking filter control syntax elements are present in the PPS or the slice header (YES branch of 182), entropy decoding unit 80 decodes an override enabled flag in the PPS that indicates whether an override of a first set of deblocking filter parameters included in the PPS by a second set of deblocking filter parameters included in the slice header is enabled (188).

If the override of the deblocking filter parameters in the PPS is not enabled (NO branch of 190), entropy decoding unit 80 determines that an override flag is not present in the slice header to be decoded (192). The override flag indicates which set of deblocking filter parameters to use to define a deblocking filter for a current video slice. In the case where deblocking filter parameters are only present in the PPS, the override flag in the slice header is unnecessary because no decision needs to be made regarding which deblocking filter parameters to use to define the deblocking filter. Instead, deblocking filter 91 is defined for the current video slice based on the deblocking filter parameters present in the PPS (194).

If the override of the deblocking filter parameters in the PPS by the deblocking parameters in the slice header is enabled (YES branch of 190), entropy decoding unit 80 decodes the override flag in the slice header that indicates whether to use the first set of deblocking filter parameters from the PPS or to override the first set of deblocking filter parameters with the second set of deblocking filter parameters included in the slice header (196). In this case, deblocking filter 91 is defined for the current video slice based on the indicated set of deblocking parameters (198).

In the examples described above in which a set of deblocking filter parameters are included in an APS, the APS may be signaled to video decoder 30 anytime parameters change for ALF, SAO or deblocking ALF and SAO parameters likely change more frequently than deblocking filter parameters. In this case, bits may be wasted when the same deblocking filter parameters are repeated in the APS whenever the SAO or ALF parameters change. As one solution to reduce APS bitstream overhead, in some examples, the techniques introduce multiple APSs to update the deblocking filter parameters separately from the ALF and SAO parameters. To avoid signaling copies of constant deblocking parameters in subsequent APSs, the slice header may refer to multiple APSs to decode video data of the slices. Several options for using multiple APSs to signal deblocking filter parameters as described below. Syntax of APSs and slice headers are presented in tables below in which strikethroughs represent syntax elements and conditions that may be removed from the APS and slice header syntax.

As a first example, the slice header may reference multiple different APSs using unique APS identifiers, e.g., aps_id[i], for each valid APS. In this case, the techniques include deblocking filter parameters in a multiple APS approach, e.g., where the multiple APS approach may be similar to that proposed in M. Li, P. Wu, "Multiple Adaptation Parameter Sets Referring," 7th JCT-VC Meeting, Geneva, Switzerland, November 2011, Doc. JCTVC-G332.

TABLE 15

Slice header syntax with APS identifiers

| slice_header( ) { | Descriptor |
|---|---|
| ...... | ... |
|   lightweight_slice_flag | u(1) |
|   if( !lightweight_slice_flag ) { | |
|     slice_type | ue(v) |
|     pic_parameter_set_id | ue(v) |
|     if( sample_adaptive_offset_enabled_flag \|\| | |
|   adaptive_loop_filter_enabled_flag \|\| | |
|   deblocking_filter_in_aps_enabled_flag) { | |
|     number_of_valid_aps | u(v) |
|     if (number_of_valid_aps != 0 ) { | |
|       for (i = 0; i < number_of_valid_aps; i++) { | |
|         aps_id[i] | ue(v) |
|       } | |
|     } | |
|   } | |
|   ...... | |
| } | |
| ...... | |
| } | |

Semantics for the slice header syntax of Table 15 are defined as follows. The deblocking_filter_enabled_flag equal to 0 means that the deblocking filter is disabled, and equal to 1 means that the deblocking filter is enabled. The number_of_valid_aps syntax element specifies the number of valid APSs for decoding the slice. The value of the number_of_valid_aps shall be in the range of [0, MaxNumberValidAps], inclusively. The value of the MaxNumberValidAps is specified in Profile/Level. If the number_of_valid_aps does not exist, its value is inferred to be 0. If the number_of_valid_aps is equal to 0, it is inferred as no active APSs. The aps_id[i] specifies the valid APS IDs for decoding the slice, where i shall be in the range of [0, number_of_valid_aps−1], inclusive.

According to the above slice header syntax, the decoding rules for a slice according to potentially multiple APSs are as follows. When the number_of_valid_aps value equals 0 or is not presented, i.e., no APS is referred to in slice header, the flags of aps_sample_adaptive_offset_flag and aps_adaptive_loop_filter_flag and aps_deblocking_filter_flag in decoding this slice shall be set to 0, and neither SAO nor ALF shall be applied in decoding the slice. If the value of inherit_dbl_params_from_APS_flag equals 0, then the deblocking filter shall be applied in decoding this slice and the deblocking parameters included in this slice header shall be used.

When the number_of_valid_aps value equals to 1, i.e., only one APS is referred to in the slice header, the flags of aps_sample_adaptive_offset_flag and aps_adaptive_loop_filter_flag and aps_deblocking_filter_flag and the tool parameters of SAO and ALF in decoding this slice shall be set equal to the values of the corresponding syntax elements presented in this referred APS. If the value of inherit_dbl_params_from_APS_flag equals 1, then the deblocking parameters shall be set equal to the values of corresponding parameters in the referred APS.

When number_of_valid_aps is larger than 1, i.e., when the multiple APSs approach is applied, for the deblocking filter, if all the aps_deblocking_filter_flag elements in the referred APSs are equal to 0, the aps_deblocking_filter_flag in decoding this slice shall be set to 0 and, if inherit_dbl_params_from_APS_flag equals 0, then the deblocking filter shall be applied to this slice using the deblocking parameters present in this slice header. Otherwise, if one and only one APS contains the aps_deblocking_filter_flag equal to 1, the aps_deblocking_filter_flag in decoding this slice shall be set to 1 and if inherit_dbl_params_from_APS_flag equals 1, then the deblocking filter with the deblocking parameters parsed from this APS shall be applied in decoding this slice. Otherwise, if there are more than one APS containing aps_deblocking_filter_flag equal to 1, the aps_deblocking_filter_flag in decoding this slice shall be set to 0 and if inherit_dbl_params_from_APS_flag equals 0 then the deblocking filter shall be applied to this slice using the deblocking parameters present in this slice header.

According to the techniques of this disclosure, the aps_deblocking_filter_flag can indicate that deblocking parameters are present in the APS, as provided in Table 16 below.

TABLE 16

APS syntax with inherit enabled flag

| aps_rbsp( ) { | Descriptor |
|---|---|
| aps_id | ue(v) |
| aps_deblocking_filter_flag | u(1) |
| aps_sample_adaptive_offset_data_present_flag | u(1) |
| aps_adaptive_loop_filter_data_present_flag | u(1) |
| if( aps_sample_adaptive_offset_data_present_flag \|\| | |
|    aps_adaptive_loop_filter_data_present_flag ) { | |
|   aps_cabac_use_flag | u(1) |
|   if( aps_cabac_use_flag ) { | |
|     aps_cabac_init_idc | ue(v) |
|     aps_cabac_init_qp_minus26 | se(v) |
|   } | |
| } | |
| if (aps_deblocking_filter_flag){ | |
|   disable_deblocking_filter_flag | u(1) |
|   if (!disable_deblocking_filter_flag) { | |
|     beta_offset_div2 | se(v) |
|     tc_offset_div2 | se(v) |
|   } | |
| } | |
| if( aps_adaptive_loop_filter_data_present_flag ) { | |
|   aps_adaptive_loop_filter_flag | u(1) |
|   if (aps_adaptive_loop_filter_flag) { | |
|     alf_data_byte_count | u(8) |
|     alf_param( ) | |
|     byte_align( ) | |
|   } | |
| } | |
| if( aps_sample_adaptive_offset_data_present_flag ) { | |
|   aps_sample_adaptive_offset_flag | u(1) |
|   if ( aps_sample_adaptive_offset_flag ) { | |
|     sao_data_byte_count | u(8) |
|     byte_align ( ) | |
|     sao_param( ) | |
|   } | |
| } | |
| rbsp_trailing_bits( ) | |
| } | |

Semantics for the APS syntax of Table 16 are defined as follows. The aps_sample_adaptive_offset_data_present_flag equal to 1 specifies that the SAO parameters exist in this APS, and equal to 0 specifies that the SAO parameters do not exist in this APS, where the SAO parameters refer to the SAO enable flag and SAO parameters when SAO enable flag is 1.

The aps_sample_adaptive_offset_flag equal to 1 specifies that the SAO is on for slices referred to the current APS, and equal to 0 specifies that the SAO is off for slices referred to the current APS. If there is no active APS or the aps_sample_adaptive_offset_flag value equals to 0, the aps_sample_adaptive_offset_flag value is inferred to be 0.

The aps_adaptive_loop_filter_data_present_flag equal to 1 specifies that the ALF parameters exist in this APS, and equal to 0 specifies that the ALF parameters does not exist in this APS, where the ALF parameters refer to the ALF enable flag and ALF parameters when ALF enable flag is 1. The aps_adaptive_loop_filter_flag equal to 1 specifies that the ALF is on for slices referred to the current APS, and equal to 0 specifies that the ALF is off for slices referred to the current APS. If there is no active APS or the aps_adaptive_loop_filter_data_present_flag value equals to 0, the aps_adaptive_loop_filter_flag value is inferred to be 0.

According to the above APS syntax, the decoding rules for a slice according to potentially multiple APSs are as follows. When number_of_valid_aps is larger than 1 (other cases as before), the APS with its ID equal to aps_id[0] can be hypothetically taken as the basic APS in decoding the current slice, while the other APSs with their IDs equal to aps_id[1], aps_id[2], . . . aps_id[number_valid_aps−1] can be taken as the amended APSs. The presented information in the amended APSs with its APS ID of aps_id[i] (i>0), which refers to the tool parameters (i.e. aps_deblocking_filter_flag and deblocking parameters for deblocking filter and/or aps_sample_adaptive_offset_flag and sao_param( ) for SAO and/or aps_adaptive_loop_filter_flag and alf_param( ) for ALF) presented in an APS when aps_deblocking_filter_flag equals 1 and/or aps_sample_adaptive_offset_data_present_flag is 1 and/or aps_adaptive_loop_filter_data_present_flag is 1, overwrites the information of the corresponding tools formerly and temporally determined by the APSs with their APS ID of aps_id[i−1], . . . , aps_id[0]. Thereby, the finally obtained values of aps_deblocking_filter_flag and of deblocking parameters are used for deblocking the current slice (additionally dependent on value of inherit_dbl_params_from_APS_flag). The finally obtained aps_sample_adaptive_offset_flag and the parameters in sao_param( ) are used for implementing SAO in decoding the current slice, and the finally obtained aps_adaptive_loop_filter_flag and the parameters in alf_param( ) are used for implementing ALF in decoding the current slice.

In other words, when multiple APSs are referred to by a slice, for each tool, according to the presentation order of the APS IDs, the last APS that contains the data_present_flag (i.e. aps_deblocking_filter_flag or aps_sample_adaptive_offset_data_present_flag or aps_adaptive_loop_filter_data_present_flag) of this tool equal to 1 is activated to initialize this tool before decoding this slice.

As a second example for using multiple APSs to signal deblocking filter parameters, the slice header may reference multiple different sub-APSs using unique sub-APS identifiers for each type of APS. In this case, the techniques include deblocking filter parameters in a sub-APS approach such as that proposed in J. Tanaka, Y. Morigami, T. Suzuki, "Non-CE4 Subtest3: Extension of Adaptation Parameter Sets syntax for Quantization matrix," 7$^{th}$ JCT-VC Meeting, Geneva, Switzerland, November 2011, Doc. JCTVC-G295.

According to the techniques of this disclosure, it is proposed to include the aps_dbl_id in the APS, as follows in Tables 17 and 18. If the inherit_dbl_params_from_APS_flag=1 then the deblocking parameters are copied from the APS with aps_dbl_id.

TABLE 17

APS syntax with inherit enabled flag and conditionally coded deblocking APS ID

| aps_rbsp( ) { | Descriptor |
|---|---|
| aps_id | ue(v) |
| aps_deblocking_filter_flag | u(1) |
| aps_sample_adaptive_offset_flag | u(1) |
| aps_adaptive_loop_filter_flag | u(1) |
| .... | |
| if (aps_deblocking_filter_flag){ | |
|   aps_dbl_id | ue(v) |
|   disable_deblocking_filter_flag | u(1) |
|   if (!disable_deblocking_filter_flag) { | |
|     beta_offset_div2 | se(v) |
|     tc_offset_div2 | se(v) |
|   } | |
| } | |
| if( aps_sample_adaptive_offset_flag ) { | |
|   aps_sao_id | ue(v) |
|   sao_data_byte_count | u(8) |
|   byte_align ( ) | |
|   sao_param( ) | |
|   byte_align ( ) | |
| } | |
| if( aps_adaptive_loop_filter_flag ) { | |
|   aps_alf_id | ue(v) |
|   alf_data_byte_count | u(8) |
|   byte_align( ) | |
|   alf_param( ) | |
|   byte_align( ) | |
| } | |
| rbsp_trailing_bits( ) | |
| } | |

TABLE 18

Slice header syntax with sub-APS identifiers

| slice_header( ) { | Descriptor |
|---|---|
| entropy_slice_flag | u(1) |
| if( !entropy_slice_flag ) { | |
|   slice_type | ue(v) |
|   pic_parameter_set_id | ue(v) |
|   ~~if(sample_adaptive_offset_enabled_flag||~~ | |
| ~~adaptive_loop_filter_enabled_flag)~~ | |
|     ~~aps_id~~ | ~~ue(v)~~ |
|   if (deblocking_filter_in_aps_enabled_flag) | |
|     aps_dbl_id | ue(v) |
|   if( sample_adaptive_offset_enabled_flag) | |
|     aps_sao_id | ue(v) |
|   if(adaptive_loop_filter_enabled_flag) | |
|     aps_alf_id | ue(v) |
|   if( quantization_matrix_enabled_flag) | |
|     aps_qmatrix_id | ue(v) |
|     frame_num | u(v) |
| ....... | |
| if( !entropy_slice_flag ) { | |
|   slice_qp_delta | se(v) |
|   inherit_dbl_params_from_APS_flag | u(1) |
|   if (!inherit_dbl_params_from_APS_flag){ | |
|     disable_deblocking_filter_flag | u(1) |
|       if (!disable_deblocking_filter_flag) { | |
|         beta_offset_div2 | se(v) |
|         tc_offset_div2 | se(v) |
|       } | |
|   } | |
| if( slice_type = = B ) | |
|   collocated_from_l0_flag | u(1) |
| if( adaptive_loop_filter_enabled_flag && | |
| aps_adaptive_loop_filter_flag ) { | |
|   byte_align( ) | |
|   alf_cu_control_param( ) | |
|   byte_align( ) | |
| } | |
| if( ( weighted_pred_flag && slice_type = = P ) || | |
| ( weighted_bipred_idc = = 1 && slice_type = = B ) ) pred_weight_table( ) | |
| } | |
| if( slice_type = = P || slice_type = = B ) | |
|   5_minus_max_num_merge_cand | ue(v) |
| for( i = 0; i < num_substreams_minus1 + 1; i++ ){ | |
|   substream_length_mode | u(2) |
|   substream_length[i] | u(v) |
| } | |
| } | |

The problem with the slice header syntax above is that the aps_dbl_id is signaled even when the inherit_dbl_params_from_APS_flag=0. As an alternative, the aps_dbl_id may be signaled in the slice header as provided in Table 19 below.

TABLE 19

Slice header syntax with conditionally coded sub-APS identifiers

| slice_header( ) { | Descriptor |
|---|---|
| entropy_slice_flag | u(1) |
| if( !entropy_slice_flag ) { | |
|   slice_type | ue(v) |
|   pic_parameter_set_id | ue(v) |
|   ~~if(sample_adaptive_offset_enabled_flag||~~ | |
| ~~adaptive_loop_filter_enabled_flag)~~ | |
|     ~~aps_id~~ | ~~ue(v)~~ |
|   if( sample_adaptive_offset_enabled_flag) | |
|     aps_sao_id | ue(v) |
|   if(adaptive_loop_filter_enabled_flag) | |
|     aps_alf_id | ue(v) |
|   if( quantization_matrix_enabled_flag) | |
|     aps_qmatrix_id | ue(v) |
|     frame_num | u(v) |
| ..... | |
| if( !entropy_slice_flag ) { | |
|   slice_qp_delta | se(v) |
|   inherit_dbl_params_from_APS_flag | u(1) |
|   if (inherit_dbl_params_from_APS_flag) { | |
|     aps_dbl_id | ue(v) |
|   } | |
|   if (!inherit_dbl_params_from_APS_flag){ | |
|     disable_deblocking_filter_flag | u(1) |
|     if (!disable_deblocking_filter_flag) { | |
|       beta_offset_div2 | se(v) |
|       tc_offset_div2 | se(v) |
|     } | |
|   } | |
| } | |
| ..... | |

As a third example for using multiple APSs to signal deblocking filter parameters, the slice header may reference multiple different APSs using linked-list APSs. In this case, the techniques include deblocking filter parameters in the APS referencing method based on linked-list APSs, e.g., as described in M. Li, P. Wu, S. Wenger, J. Boyce, "APS Referencing," 8th JCT-VC Meeting, San Jose, February 2011.

The APS Referencing document builds upon the partial APS update method proposed in JCTVC-G332 in the sense that it also introduces flags in the APS to signal the presence of loop filter and scaling list parameters. In addition, the ref_aps_flag and ref_aps_id syntax elements are introduced in the APS to enable the partial update of parameters through a linked list mechanism. According to the techniques of this disclosure, the aps_deblocking_filter_flag can indicate that deblocking parameters are present in the APS, as provided in Table 20 below. Associated changes to the syntax of the slice header are provided in Table 21 below.

TABLE 20

APS syntax with inherit enabled flag and linked-list APSs

| aps_rbsp( ) { | Descriptor |
|---|---|
|   aps_id | ue(v) |
|   ref_aps_flag | u(1) |
|   if(ref_aps_flag) { | |
|     ref_aps_id | ue(v) |
|   } | |
|   aps_deblocking_filter_flag | u(1) |
|   aps_scaling_list_data_present_flag | u(1) |
|   aps_sample_adaptive_offset_data_present_flag | u(1) |
|   aps_adaptive_loop_filter_data_present_flag | u(1) |
|   ........ | |
|   if (aps_deblocking_filter_flag){ | |
|     disable_deblocking_filter_flag | u(1) |
|     if (!disable_deblocking_filter_flag) { | |
|       beta_offset_div2 | se(v) |
|       tc_offset_div2 | se(v) |
|     } | |
|   } | |
|   if(aps_scaling_list_data_present_flag) { | |
|     ~~scaling_list_data_byte_count~~ | ~~u(8)~~ |
|     ~~byte_align( )~~ | |
|     scaling_list_param( ) | |
|     ~~byte_align( )~~ | |
|   } | |
|   if( aps_sample_adaptive_offset_data_present_flag ) { | |
|     ~~sao_data_byte_count~~ | ~~u(8)~~ |
|     ~~byte_align( )~~ | |
|     sao_param( ) | |
|     ~~byte_align( )~~ | |
|   } | |
|   if( aps_adaptive_loop_filter_data_present_flag ) { | |
|     ~~alf_data_byte_count~~ | ~~u(8)~~ |
|     ~~byte_align( )~~ | |
|     alf_param( ) | |
|   } | |
|   rbsp_trailing_bits( ) | |
| } | |

TABLE 21

Slice header syntax with linked-list APS identifiers

| slice_header( ) { | Descriptor |
|---|---|
|   lightweight_slice_flag | u(1) |
|   if( !lightweight_slice_flag ) { | |
|     slice_type | ue(v) |
|     pic_parameter_set_id | ue(v) |
|     if( scaling_list_enabled_flag \|\| | |
|       sample_adaptive_offset_enabled_flag \|\| | |
|       adaptive_loop_filter_enabled_flag \|\| | |
|       deblocking_filter_in_aps_enabled_flag) aps_id | ue(v) |
|     ...... | |
|     if (deblocking_filter_in_aps_enabled_flag && | |
|       aps_deblocking_filter_flag) { | |
|       inherit_dbl_params_from_APS_flag | u(1) |
|     /* Note that inherit_dbl_params_from_APS_flag = 0 is | |
|     inferred if deblocking_filter_in_aps_enabled_flag = 0 or | |
|     aps_deblocking_filter_flag=0. */ | |
|     } | |
|     if (!inherit_dbl_params_from_APS_flag){ | |
|       disable_deblocking_filter_flag | u(1) |
|       if (!disable_deblocking_filter_flag) { | |
|         beta_offset_div2 | se(v) |
|         tc_offset_div2 | se(v) |
|       } | |
|     } | |
|   if (scaling_list_enabled_flag) | |
|     scaling_list_flag | u(1) |
|   if (sample_adaptive_offset_enabled_flag) | |
|     sample_adaptive_offset_flag | u(1) |

TABLE 21-continued

Slice header syntax with linked-list APS identifiers

| slice_header( ) { | Descriptor |
|---|---|
|   if (adaptive_loop_filter_enabled_flag) | |
|     adaptive_loop_filter_flag | u(1) |
|   } | |
|   ...... | |
| } | |

Semantics for the APS and slice header syntax of Tables 20 and 21 are defined as follows. The aps_id identifies the adaptation parameter set that is referred to by the slice header or by the ref_aps_id in another adaptation parameter set. The value of aps_id shall be in the range of 0 to 7, inclusive. The ref_aps_flag equal to 1 specifies that this adaptation parameter set references another adaptation parameter set. The ref_aps_flag equal to 0 specifies that this adaptation parameter set does not reference any other adaptation parameter set. The ref_aps_id specifies that the previous adaptation parameter set with aps_id equal to ref_aps_id is referenced by this adaptation parameter set.

The aps_deblocking_filter_flag indicates that deblocking parameters are present in the APS (equal to 1) or not present (equal to 0). The aps_scaling_list_data_present_flag equal to 1 specifies that scaling list parameters are present in this adaptation parameter set, and equal to 0 specifies that scaling list parameters are not present in this adaptation parameter set. The aps_sample_adaptive_offset_data_present_flag equal to 1 specifies that SAO parameters are present in this adaptation parameter set, and equal to 0 specifies that SAO parameters are not present in this adaptation parameter set. The aps_adaptive_loop_filter_data_present_flag equal to 1 specifies that the ALF parameters are present in this adaptation parameter set, and equal to 0 specifies that the ALF parameters are not present in this adaptation parameter set.

The scaling_list_flag equal to 1 specifies that the scaling matrix is applied for the current slice, and equal to 0 specifies that the scaling matrix is not applied for the current slice. The value of scaling_list_flag_flag shall be the same for all slices in the current frame. The adaptive_loop_filter_flag equal to 1 specifies that the adaptive loop filter is applied for the current slice, and equal to 0 specifies that the adaptive loop filter is not applied for the current slice. The value of adaptive_loop_filter_flag shall be the same for all slices in the current frame. The sample_adaptive_offset_flag equal to 1 specifies that sample adaptive offset is applied for the current slice, and equal to 0 specifies that sample adaptive offset is not applied for the current slice. The value of sample_adaptive_offset_flag shall be the same for all slices in the current frame.

As a fourth option for using multiple APSs to signal deblocking filter parameters, the slice header may include partial updates of deblocking filter parameters specified in the APS. In this case, the techniques include partial updates of deblocking filter parameters. These techniques may be applied, for example, in the method of updating APS parameters using slice header signaling described in A. Minezawa, K. Sugimoto, S.-I. Sekiguchi, "On partial updating of APS parameters," 8th JCT-VC Meeting, San Jose, Calif., USA, February 2012, Doc. JCTVC-H0255.

The techniques of this disclosure may update the deblocking filter adjustment parameters in the APS identified by the aps_id in the slice header based on deblocking filter adjustment parameters included in the slice header. The techniques may introduce an update_dbl_params_in_APS_flag in the slice header to indicate when deblocking filter adjustment parameters in the APS are to be updated by the deblocking filter adjustment parameters in the slice header, as presented in Table 22 below.

TABLE 22

Slice header syntax with update deblocking parameters in APS flag

| slice_header( ) { | Descriptor |
|---|---|
|     entropy_slice_flag | u(1) |
|     if( !entropy_slice_flag ) { | |
|         slice_type | ue(v) |
|         pic_parameter_set_id | ue(v) |
|         if( sample_adaptive_offset_enabled_flag \|\| | |
|         adaptive_loop_filter_enabled_flag ) | |
|             aps_id | ue(v) |
|     .... | |
|     if( !entropy_slice_flag ) { | |
|         slice_qp_delta | se(v) |
|         inherit_dbl_params_from_APS_flag | u(1) |
|         update_dbl_params_in_APS_flag | u(1) |
|         if ( (!inherit_dbl_params_from_APS_flag) \|\| | |
|         update_dbl_params_in_APS_flag ) { | |
|             disable_deblocking_filter_flag | u(1) |
|             if ( !disable_deblocking_filter_flag ) { | |
|                 beta_offset_div2 | se(v) |
|                 tc_offset_div2 | se(v) |
|             } | |
|         } | |
|     ..... | |
| } | |

Semantics for the slice header syntax of Table 22 are defined as follows. The update_dbl_params_in_APS_flag equal to 1 means that the deblocking filter adjustment parameters in the APS with ID equal to aps_id shall be updated with the deblocking filter adjustment parameters in the slice header, and equal to 0 means no update.

In addition, techniques of this disclosure may include updating the deblocking filter adjustment parameters in the APS identified by the aps_dbl_id in the slice header based on deblocking filter adjustment parameters included in the slice header. The aps_dbl_id of the APS to be updated with the slice header deblocking filter adjustment parameters may be signaled separately in the slice header, as presented in Table 23 below.

TABLE 23

Slice header syntax with update deblocking parameters in APS flag and sub-APS identifiers

| slice_header( ) { | Descriptor |
|---|---|
|     entropy_slice_flag | u(1) |
|     if( !entropy_slice_flag ) { | |
|         slice_type | ue(v) |
|         pic_parameter_set_id | ue(v) |
|         if( sample_adaptive_offset_enabled_flag \|\| | |
|         adaptive_loop_filter_enabled_flag ) | |
|             aps_id | ue(v) |
|     .... | |
|     if( !entropy_slice_flag ) { | |
|         slice_qp_delta | se(v) |
|         inherit_dbl_params_from_APS_flag | u(1) |
|         update_dbl_params_in_APS_flag | u(1) |
|         if (update_dbl_params_in_APS_flag) | |
|             aps_dbl_id | |
|         if ( (!inherit_dbl_params_from_APS_flag) \|\| | |
|         update_dbl_params_in_APS_flag ) { | |
|             disable_deblocking_filter_flag | u(1) |
|             if ( !disable_deblocking_filter_flag ) { | |
|                 beta_offset_div2 | se(v) |
|                 tc_offset_div2 | se(v) |
|             } | |
|         } | |
|     ..... | |
| } | |

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   decoding a picture layer syntax element in a picture layer parameter set, the picture layer syntax element indicating whether deblocking filter parameters are present in the picture layer parameter set;
   when the picture layer syntax element indicates that deblocking filter parameters are present in the picture layer parameter set, decoding a slice layer syntax element in a slice header defined to indicate whether to use a first set of deblocking filter parameters included in the picture layer parameter set or a second set of deblocking filter parameters included in the slice header to define a deblocking filter applied to a current video slice; and
   when the picture layer syntax element indicates that deblocking filter parameters are not present in the picture layer parameter set the slice header, determining that the slice layer syntax element is not present in the slice header to be decoded.

2. The method of claim 1, wherein the picture layer parameter set comprises one of a picture parameter set (PPS) or an adaptation parameter set (APS).

3. The method of claim 1, further comprising, when the picture layer syntax element indicates that deblocking filter parameters are not present in both the picture layer parameter set and the slice header, defining the deblocking filter applied to the current video slice based on deblocking filter parameters present in one of the picture layer parameter set and the slice header.

4. The method of claim 1, wherein decoding the picture layer syntax element comprises decoding an override enabled flag in the picture layer parameter set that indicates whether an override of the first set of deblocking filter parameters by the second set of deblocking filter parameters is enabled.

5. The method of claim 4, wherein, when the override is enabled, decoding the slice layer syntax element comprises decoding an override flag in the slice header that indicates whether to use the first set of deblocking filter parameters from the picture layer parameter set or to override the first set of deblocking filter parameters with the second set of deblocking filter parameters included in the slice header to define the deblocking filter applied to the current video slice.

6. The method of claim 4, wherein, when the override is not enabled, determining that the slice layer syntax element is not present in the slice header comprises determining that an override flag is not present in the slice header to be decoded, further comprising defining the deblocking filter applied to the current video slice based on the first set of deblocking filter parameters included in the picture layer parameter set.

7. The method of claim 1, wherein decoding the picture layer syntax element comprises decoding an inherit enabled flag that indicates whether the first set of deblocking filter parameters is present in the picture layer parameter set to be inherited by the slice header.

8. The method of claim 7, wherein, when the first set of deblocking filter parameters is present to be inherited by the slice header, decoding the slice layer syntax element comprises decoding an inherit flag in the slice header that indicates whether to use the second set of deblocking filter parameters included in the slice header or to inherit the first set of deblocking filter parameters from the picture layer parameter set to define the deblocking filter applied to the current video slice.

9. The method of claim 7, wherein, when the first set of deblocking filter parameters is not present to be inherited by the slice header, determining that the slice layer syntax element is not present in the slice header comprises determining that an inherit flag is not present in the slice header to be decoded, further comprising defining the deblocking filter applied to the current video slice based on the second set of deblocking filter parameters included in the slice header.

10. The method of claim 1, further comprising decoding a third syntax element defined to indicate that deblocking filter control syntax elements are present in the picture layer parameter set and the slice header prior to decoding the picture layer syntax element, wherein the picture layer syntax element and the slice layer syntax element comprise deblocking filter control syntax elements.

11. The method of claim 10, wherein decoding the third syntax element comprises decoding a control present syntax element in one of the picture layer parameter set and a sequence parameter set (SPS).

12. The method of claim 1, further comprising decoding a fourth syntax element defined to indicate that the deblocking filter is enabled for the current video slice.

13. The method of claim 12, wherein decoding the fourth syntax element comprises decoding a deblocking filter enabled flag in a sequence parameter set (SPS) prior to decoding the picture layer syntax element.

14. A video decoding device comprising:
   a memory that stores video data; and
   one or more processors configured to decode a picture layer syntax element in a picture layer parameter set, the picture layer syntax element indicating whether deblocking filter parameters are present in the picture layer parameter set,
   wherein the one or more processors are configured to, when the picture layer syntax element indicates that deblocking filter parameters are present in the picture layer parameter set, decode a slice layer syntax element in a slice header defined to indicate whether to use a first set of deblocking filter parameters included in the picture layer parameter set or a second set of deblocking filter parameters included in the slice header to define a deblocking filter applied to a current video slice, and
   wherein the one or more processors is configured to, when the picture layer syntax element indicates that deblocking filter parameters are not present in both the picture layer parameter set and the slice header, determine that the slice layer syntax element is not present in the slice header to be decoded.

15. The video decoding device of claim 14, wherein the picture layer parameter set comprises one of a picture parameter set (PPS) or an adaptation parameter set (APS).

16. The video decoding device of claim 14, wherein the one or more processors are configured to, when the picture layer syntax element indicates that deblocking filter parameters are not present in both the picture layer parameter set and the slice header, define the deblocking filter applied to the current video slice based on deblocking filter parameters present in one of the picture layer parameter set and the slice header.

17. The video decoding device of claim 14, wherein the one or more processors are configured to decode an override enabled flag in the picture layer parameter set that indicates whether an override of the first set of deblocking filter parameters by the second set of deblocking filter parameters is enabled.

18. The video decoding device of claim 17, wherein the one or more processors are configured to, when the override is enabled, decode an override flag in the slice header that indicates whether to use the first set of deblocking filter parameters from the picture layer parameter set or to override the first set of deblocking filter parameters with the second set of deblocking filter parameters included in the slice header to define the deblocking filter applied to the current video slice.

19. The video decoding device of claim 17, wherein the one or more processors are configured to, when the override is not enabled, determine that an override flag is not present in the slice header to be decoded, and define the deblocking filter applied to the current video slice based on the first set of deblocking filter parameters included in the picture layer parameter set.

20. The video decoding device of claim 14, wherein the one or more processors are configured to decode an inherit enabled flag that indicates whether the first set of deblocking filter parameters is present in the picture layer parameter set to be inherited by the slice header.

21. The video decoding device of claim 20, wherein the one or more processors are configured to, when the first set of deblocking filter parameters is present to be inherited by the slice header, decode an inherit flag in the slice header that indicates whether to use the second set of deblocking filter parameters included in the slice header or to inherit the first set of deblocking filter parameters from the picture layer parameter set to define the deblocking filter applied to the current video slice.

22. The video decoding device of claim 20, wherein the one or more processors are configured to, when the first set of deblocking filter parameters is not present to be inherited by the slice header, determine that an inherit flag is not present in the slice header to be decoded, and define the deblocking filter applied to the current video slice based on the second set of deblocking filter parameters included in the slice header.

23. A video decoding device comprising:
means for decoding a picture layer syntax element in a picture layer parameter set, the picture layer syntax element indicating whether deblocking filter parameters are present in the picture layer parameter set;
when the picture layer syntax element indicates that deblocking filter parameters are present in the picture layer parameter set, means for decoding a slice layer syntax element in a slice header defined to indicate whether to use a first set of deblocking filter parameters included in the picture layer parameter set or a second set of deblocking filter parameters included in the slice header to define a deblocking filter applied to a current video slice; and
when the picture layer syntax element indicates that deblocking filter parameters are not present in both the picture layer parameter set and the slice header, means for determining that the slice layer syntax element is not present in the slice header to be decoded.

24. The video decoding device of claim 23, wherein the picture layer parameter set comprises a picture parameter set (PPS).

25. The video decoding device of claim 23, wherein the means for decoding the picture layer syntax element comprise means for decoding an override enabled flag in the picture layer parameter set that indicates whether an override of the first set of deblocking filter parameters by the second set of deblocking filter parameters is enabled.

26. The video decoding device of claim 25, wherein, when the override is enabled, the means for decoding the slice layer syntax element comprise means for decoding an override flag in the slice header that indicates whether to use the first set of deblocking filter parameters from the picture layer parameter set or to override the first set of deblocking filter parameters with the second set of deblocking filter parameters included in the slice header to define the deblocking filter applied to the current video slice.

27. The video decoding device of claim 25, wherein, when the override is not enabled, the means for determining that the slice layer syntax element is not present in the slice header comprise means for determining that an override flag is not present in the slice header to be decoded, further comprising means for defining the deblocking filter applied to the current video slice based on the first set of deblocking filter parameters included in the picture layer parameter set.

28. A non-transitory computer readable medium comprising instructions for decoding video data that when executed cause one or more processors to:
decode a picture layer syntax element in a picture layer parameter set, the picture layer syntax element indicating whether deblocking filter parameters are present in the picture layer parameter set;
when the picture layer syntax element indicates that deblocking filter parameters are present in the picture layer parameter set, decode a slice layer syntax element in a slice header defined to indicate whether to use a first set of deblocking filter parameters included in the picture layer parameter set or a second set of deblocking filter parameters included in the slice header to define a deblocking filter applied to a current video slice; and
when the picture layer syntax element indicates that deblocking filter parameters are not present in both the picture layer parameter set and the slice header, determine that the slice layer syntax element is not present in the slice header to be decoded.

* * * * *